United States Patent
Hamasaki et al.

(10) Patent No.: US 7,991,234 B2
(45) Date of Patent: Aug. 2, 2011

(54) APPARATUS AND METHOD FOR IMAGE-CLASSIFYING, AND RECORDING MEDIUM STORING COMPUTER-READABLE PROGRAM FOR THE SAME

(75) Inventors: Shogo Hamasaki, Hirakata (JP); Atsushi Saso, Yokohama (JP); Noriko Sugimoto, Takarazuka (JP); Soichiro Fujioka, Sakai (JP)

(73) Assignee: Panasonic Corporation, Osaka (JP)

( * ) Notice: Subject to any disclaimer, the term of this patent is extended or adjusted under 35 U.S.C. 154(b) by 1678 days.

(21) Appl. No.: 11/001,071

(22) Filed: Dec. 2, 2004

(65) Prior Publication Data

US 2005/0128305 A1 Jun. 16, 2005

(30) Foreign Application Priority Data

Dec. 12, 2003 (JP) .................. 2003-414481

(51) Int. Cl.
*G06K 9/62* (2006.01)
(52) U.S. Cl. ........................................ 382/224
(58) Field of Classification Search .............. 382/224, 382/305; 348/231.99, 231.2, 231.3, 231.5
See application file for complete search history.

(56) References Cited

U.S. PATENT DOCUMENTS

| | | | | |
|---|---|---|---|---|
| 5,057,607 A * | 10/1991 | Zmijewski et al. | ........... | 540/364 |
| 5,966,698 A * | 10/1999 | Pollin | .............. | 705/34 |
| 6,437,797 B1 * | 8/2002 | Ota | .............. | 345/638 |
| 6,452,612 B1 * | 9/2002 | Holtz et al. | .................. | 715/723 |
| 6,606,411 B1 * | 8/2003 | Loui et al. | ..................... | 382/224 |
| 6,819,356 B1 * | 11/2004 | Yumoto | ..................... | 348/231.2 |
| 7,145,695 B2 * | 12/2006 | Endo et al. | ..................... | 358/2.1 |
| 7,231,088 B2 * | 6/2007 | Echigo et al. | ................ | 382/225 |

FOREIGN PATENT DOCUMENTS

| | | |
|---|---|---|
| JP | 10-254746 | 9/1998 |
| JP | 2000-217057 | 8/2000 |
| JP | 2001-228528 | 8/2001 |
| JP | 2002-183206 | 6/2002 |
| JP | 2002-191015 | 7/2002 |
| JP | 2003-58867 | 2/2003 |
| JP | 2004-120486 | 4/2004 |
| JP | 2005-039359 | 2/2005 |

* cited by examiner

*Primary Examiner* — Brian Q Le
(74) *Attorney, Agent, or Firm* — Wenderoth, Lind & Ponack, L.L.P.

(57) ABSTRACT

An image information-inputting unit inputs image information including position information indicating a position where an image was captured. A reference distance-calculating unit calculates a reference distance from a predetermined reference position utilizing the image information. An image information-classifying unit classifies the image information based on the reference distance.

20 Claims, 20 Drawing Sheets

Fig. 4

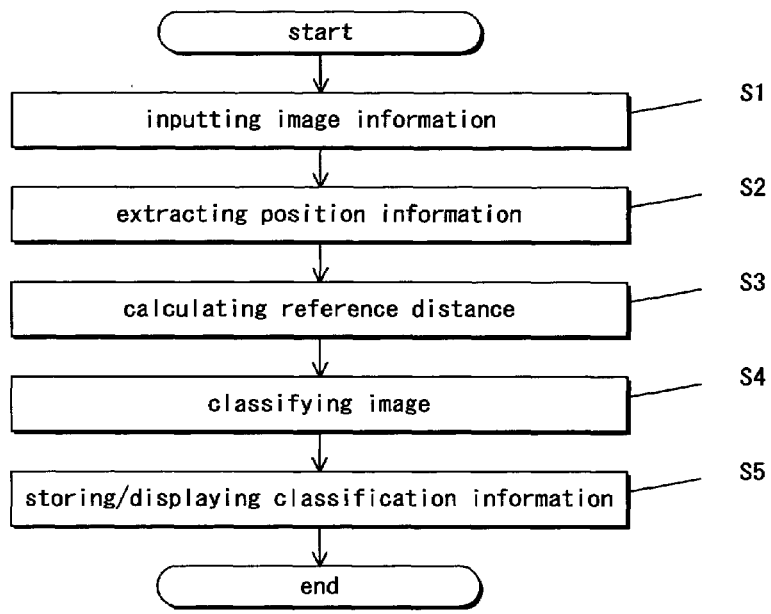

Fig. 5

| image ID | time information (yr/mon/day/hr/min/sec) | position information (latitude/longitude/altitude) |
|---|---|---|
| P1 | 2003/12/24/ 05/30/10 | 135° 30' 10"east/45° 10' 03" north/30m |
| P2 | 2003/12/24/ 05/40/15 | 135° 30' 10"east/45° 10' 03" north/30m |
| P3 | 2003/12/24/ 05/55/20 | 135° 30' 10"east/45° 10' 03" north/30m |
| P4 | 2003/12/24/ 06/50/10 | 135° 30' 11"east/45° 10' 05" north/31m |
| P5 | 2003/12/24/ 09/30/30 | 135° 30' 11"east/45° 10' 05" north/31m |
| P6 | 2003/12/24/ 11/30/10 | 135° 30' 11"east/45° 10' 05" north/31m |
| P7 | 2003/12/24/ 11/45/20 | 135° 30' 11"east/45° 10' 05" north/31m |
| P8 | 2003/12/24/ 14/40/10 | 135° 40' 20"east/45° 11' 10" north/120m |
| ⋮ | ⋮ | ⋮ |
| P16 | 2003/12/24/ 03/30/10 | 135° 30' 11"east/45° 10' 03" north/31m |

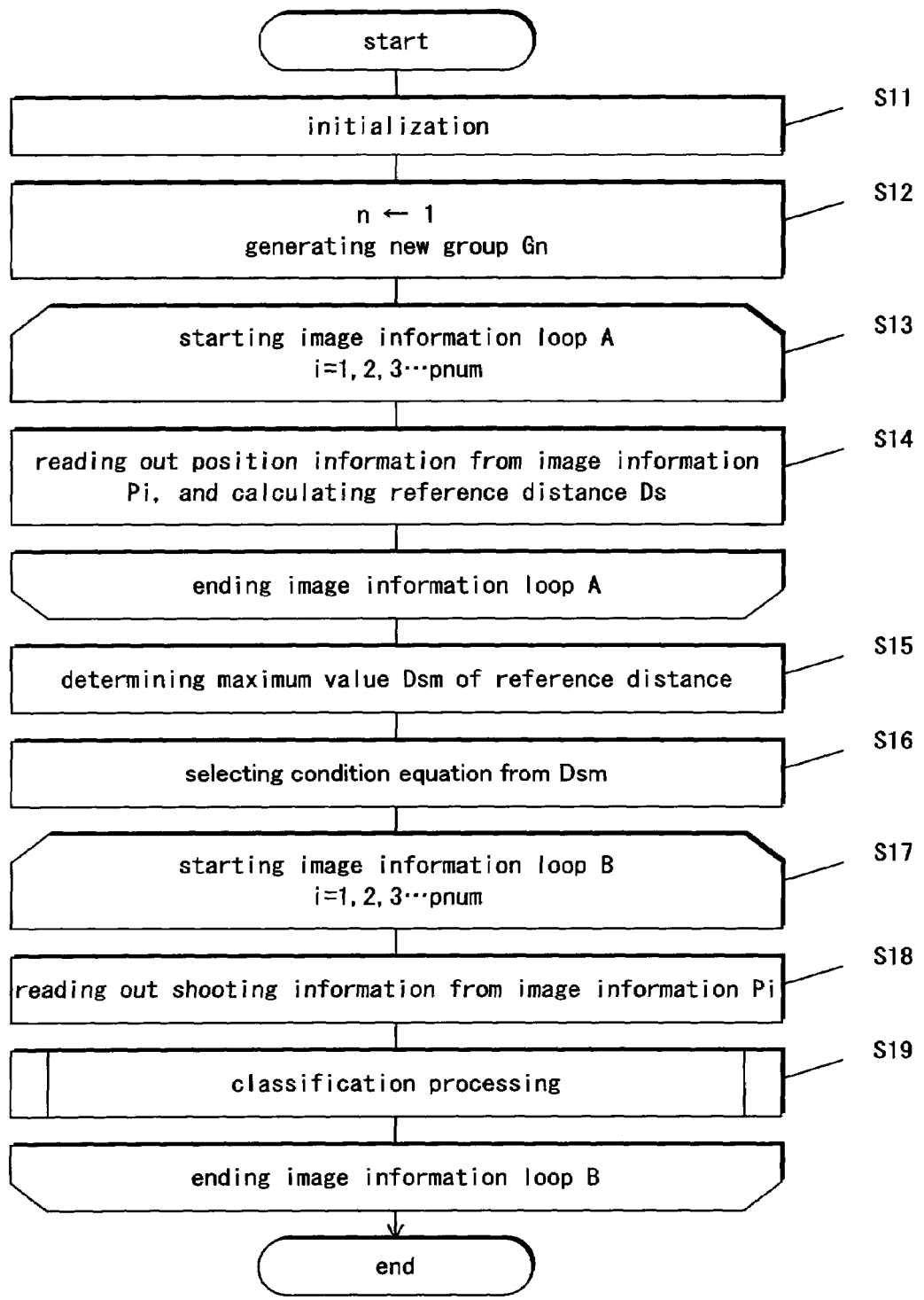

Fig. 8(a)

| classification condition equation ID | selection condition | classification equation parameter |
|---|---|---|
| B1 | 0m ≦ Dsm < 30km | Dth1=20km, |
| B2 | 30km ≦ Dsm < 60km | Dth1=20km, Dth2=40km, |
| B3 | 60km ≦ Dsm < 100km | Dth1=20km, Dth2=40km, Dth3=70km, |

Fig. 8(b)

| group ID | image ID |
|---|---|
| G1 | P1, P2, P3 |
| G2 | P4, P5, P6, P7 |
| G3 | P8, P9, P10 |
| G4 | P11, P12, P13 |
| G5 | P14, P15, P16 |

Fig. 14(a)

| classification condition equation ID | selection condition | classification equation parameter |
|---|---|---|
| B1 | 0m ≦ Dsm < 30km | Dth=20km, D1=100m, D2=1km |
| B2 | 30km ≦ Dsm < 60km | Dth1=20km, Dth2=40km, D1=100m, D2=1km, D3=10km |
| B3 | 60km ≦ Dsm < 100km | Dth1=20km, Dth2=40km, Dth3=70km, D1=100m, D2=1km, D3=10km, D4=50km |

Fig. 14(b)

| group ID | image ID |
|---|---|
| G1 | P1, P2, P3 |
| G2 | P4, P5, P6, P7 |
| G3 | P8, P9, P10, P11, P12, P13 |
| G4 | P14, P15, P16 |

Fig. 18

| classification condition equation ID | selection condition | classification equation parameter |
|---|---|---|
| B1 | 0m ≦ Dsm < 30km | Dth=20km, D1=100m, D2=1km |
| B2 | 30km ≦ Dsm < 60km | Dth1=20km, Dth2=40km, D1=100m, D2=1km, D3=10km |
| B3 | 60km ≦ Dsm < 100km | Dth1=20km, Dth2=40km, Dth3=70km, D1=100m, D2=1km, D3=10km, D4=50km |

# APPARATUS AND METHOD FOR IMAGE-CLASSIFYING, AND RECORDING MEDIUM STORING COMPUTER-READABLE PROGRAM FOR THE SAME

BACKGROUND OF THE INVENTION

1. Field of the Invention

The present invention relates to an image-classifying apparatus, an image-classifying method, and a program operable to classify image information of a still image or a moving image captured by an imaging apparatus, for example, a digital still camera, a camera-built-in cellular phone, a movie camera, and so on.

2. Description of the Related Art

In recent years, the availability of personal imaging apparatuses, which captures digital images, for example, a digital still camera (hereinafter, a digital camera) and a camera-built-in cellular phone, has spread rapidly. As the storage capacity of an imaging apparatus increases, a user thereof can take many images. However, the user cannot see all the images within a short time in many cases. A technique that allows the user to see the images more efficiently is needed.

In order to solve this problem, Japanese patent application Laid-open No. 2003-58867 discloses a method, comprising: automatically classifying a plurality of images into one of a plurality of groups in accordance with information, which is so-called meta information added to each of the plurality of images. Due to this, the user can classify images and can see easily the plurality of images.

To be more specific, time information indicating when the image was captured is extracted. A histogram is created. A horizontal axis of the histogram indicates a time slot when the image was captured. A vertical axis of the histogram indicates how many images were captured at the time slot. Setting borders of a group to a place where no image was captured, thereby one or more groups are defined. A set of image information belonging to one of the plurality of groups is managed utilizing a corresponding folder, thereby classifying the plurality of images into one of the plurality of groups.

Japanese patent application Laid-open No. H10-254746 discloses another method, comprising: classifying an image into one of a set of groups based on positional information indicating where the image was captured, as follows. An imaging apparatus is connected to a cellular phone, and the shooting apparatus acquires a base station ID, with which the cellular phone communicates. In accordance with a base station ID acquired when an image was captured, the image is classified into one of groups and managed.

However, an expected image group of elements that the user thinks belongs to one event and a generated image group of elements into which are classified according to the prior art do not always correspond to each other. In this specification, an "event" means an action, which a user subjectively perceives and recognizes as a bundle of occurrence, such as a home party, a festival, a memorial ceremony, or a trip.

For example, even when the user wants to classify several days of trip as one event "trip to Hokkaido", since images were practically captured in several days, when the images are classified into by time, the images are classified into two or more groups, although the images should be classified into one group according to the user's cognizance.

When images are classified using information of a place where the image was captured and a user has attended two events held at home and neighborhood on the same day, the user wants to separately classify the images into two events "home party" and "neighborhood". However, the images may be classified into the same group, because the images have been taken at places near each other.

These problems have been caused because of the cognitive tendency of users. The users tend to feel actions, which happen near neighborhood within relatively short time and in a small range of movement, belong to one event, and actions, which happen far away from his home within relatively long time and wide range of movement, belong to another event.

OBJECTS AND SUMMARY OF THE INVENTION

An object of the present invention is to provide an image-classifying apparatus that can appropriately classify image information corresponding to an occurrence into one group, which the user recognizes to be an event.

A first aspect of the present invention provides an image-classifying apparatus comprising: an image information-inputting unit operable to input image information including position information indicating a position where an image was captured; a reference distance-calculating unit operable to calculate, utilizing the position information, a reference distance between a reference position and the position where the image was captured; and an image-classifying unit operable to classify, utilizing a classification condition based on the reference distance, the image to generate a classification result.

According to the first aspect, since an image is classified using the reference distance based on a reference place decided by a user, one or more images that the user recognizes as corresponding to an event can be appropriately classified into one group.

A second aspect of the present invention provides an image-classifying apparatus as defined in the first aspect of the present invention, further comprising: a classification condition-storing unit operable to store a plurality of conditions to be utilized when the image-classifying unit classifies the image, wherein the image-classifying unit is operable to classify, utilizing the classification condition based on the reference distance among the plurality of conditions stored in the classification condition-storing unit, the image.

According to the second aspect, since an image can be classified utilizing a classification condition based on the reference distance among the plurality of conditions, one or more images that the user recognizes corresponding to an event (e.g. a trip or an incident which happened in a neighborhood), can be appropriately classified into one group.

A third aspect of the present invention provides an image-classifying apparatus as defined in the first aspect of the present invention, further comprising: a distance difference-calculating unit operable to calculate, utilizing the position information, a distance difference between the position where the image was captured and a position where an image immediately before the image was captured, wherein the image-classifying unit is operable to classify, based on the reference distance and the distance difference calculated by the distance difference-calculating unit, the image.

According to the third aspect, since an image can be classified using the reference distance regarding the place where the image was captured, one or more images can be appropriately classified into one group based on a distance of movement of the user.

A fourth aspect of the present invention provides an image-classifying apparatus as defined in the third aspect of the present invention, wherein the classification condition includes a distance difference threshold for the distance difference calculated by the distance difference-calculating unit, wherein the image-classifying unit is operable to classify, utilizing one of a plurality of distance differences based on the reference distance, the image, and wherein the plurality of distance differences differ from each other.

According to the fourth aspect, since an image can be classified using different distance difference thresholds depending on the reference distance, detailed classification can be performed in accordance with a moving distance. For example, in a trip the moving distance is long, and in a neighborhood the moving distance is short.

A fifth aspect of the present invention provides an image-classifying apparatus as defined in the first aspect of the present invention, wherein the image information includes time information indicating a time when the image was captured, wherein the image-classifying apparatus further comprises a time difference-calculating unit operable to calculate, utilizing the time information, a time difference between the time when the image was captured and time when an image immediately before the image was captured, and wherein the image-classifying unit is operable to classify the image based on the reference distance and the time difference calculated by the time difference-calculating unit.

According to the fifth aspect, since classification of an image is performed using the time difference between the time when an image was captured and the time when another image immediately before the image was captured, suitable classification of the image can be performed based on the frequency of shooting.

A sixth aspect of the present invention provides an image-classifying apparatus as defined in the fifth aspect of the present invention, wherein the classification condition includes a time difference threshold for the time difference calculated by the time difference-calculating unit, wherein the image-classifying unit is operable to classify, utilizing one of a plurality of time differences according to the reference distance, the image, and wherein the plurality of time differences differ from each other.

According to the sixth aspect, since classification of an image can be performed utilizing one of the time differences according to the reference distance, detailed classification can be performed according to the user's reference distance. For example, in a trip images are frequently captured, in a neighborhood images are occasionally captured.

A seventh aspect of the present invention provides an image-classifying apparatus as defined in the first aspect of the present invention, wherein the image information includes time information indicating a time when the image was captured, wherein the image-classifying apparatus further comprises: a time difference-calculating unit operable to calculate, utilizing the time information, a time difference between the time when the image was captured and time when an image immediately before the image was captured; and a distance difference-calculating unit operable to calculate, utilizing the position information, a distance difference between the position where the image was captured and a position where an image immediately before the image was captured, and wherein the image-classifying unit is operable to classify the image, based on the reference distance, the time difference calculated by the time difference-calculating unit, and the distance difference calculated by the distance difference-calculating unit.

According to the seventh aspect, since classification of an image is performed based on both the time difference and the distance difference wherein the image was captured, classification corresponding to both the shooting frequency and the user's movement distance can be performed.

An eighth aspect of the present invention provides an image-classifying apparatus as defined in the seventh aspect of the present invention, wherein the classification condition includes a time difference threshold for the time difference calculated by the time difference-calculating unit, and a distance difference threshold for the distance difference calculated by the distance difference-calculating unit, wherein the image-classifying unit is operable to classify, utilizing one of a plurality of time difference thresholds and one of plurality of distance difference thresholds, the image, and wherein the plurality of time difference thresholds differ from each other according to the reference distance, and the plurality of distance difference thresholds differ from each other according to the reference distance.

According to the eighth aspect, since the classification is performed using the time difference thresholds and the distance difference thresholds, each differing from each other according to the reference distance, further detailed hierarchical classification (e.g. distinguishing frequent shooting during a trip from non-frequent shooting during a trip) can be performed.

A ninth aspect of the present invention provides an image-classifying apparatus as defined in the first aspect of the present invention, wherein the image-classifying unit is operable to classify the image into a group among a plurality of groups, the image-classifying apparatus further comprising: a map information-storing unit operable to store a plurality of items of map information; a representative position-calculating unit operable to calculate, based on the position information relating to one or more images belonging to one of the plurality of groups, a representative position; a distribution-calculating unit operable to calculate, based on the position information relating to one or more images belonging to one of the plurality of groups, a distribution; and a comment-generating unit operable to select from the plurality of items of the map information, based on the representative position and the position information, map information corresponding to the group into which the image is classified by the image-classifying unit, and to generate a comment.

According to the ninth aspect, a suitable group name (e.g. a landmark name, an area name, a prefecture/state name and a region name) can be given to each of the groups of one or more classified images utilizing the representative position and distribution in which the classified images were captured.

A tenth aspect of the present invention provides an image-classifying apparatus as defined in the first aspect of the present invention, further comprising: an output unit operable to output the image according to the classification result.

According to the tenth aspect, since an image can be suitably classified into a group, and the image can be displayed as group based on the result, a user can view many images all together quickly.

An eleventh aspect of the present invention provides an image-classifying system comprising: an image-shooting apparatus; an image-classifying apparatus; and a display apparatus, wherein the image-shooting apparatus is operable to capture an image, wherein the image-classifying apparatus comprises: an image information-inputting unit operable to input image information including position information indicating a position where an image was captured; a reference distance-calculating unit operable to calculate, utilizing the position information, a reference distance between a reference position and the position where the image was captured; an image-classifying unit operable to classify, utilizing a classification condition based on the reference distance, the image to generate a classification result; and an output unit operable to output the image according to the classification result, and wherein the display apparatus is operable to display the image outputted from the image-classifying apparatus.

According to the eleventh aspect, since many images which were captured by the image-shooting apparatus are suitably classified into one or more groups and the result can be displayed on the display apparatus, utilizing a key to the groups a user can view images all together quickly.

A twelfth aspect of the present invention provides an image-classifying method comprising: inputting image information including position information indicating a position where an image was captured; calculating, utilizing the position information, a reference distance between a reference position and the position where the image was captured; and classifying, utilizing a classification condition based on the reference distance, the image to generate a classification result.

According to the twelfth aspect, since the image is classified using the reference distance based on a reference place decided by a user, one or more images that the user recognizes corresponding to an event, can be appropriately classified into one group.

A thirteenth aspect of the present invention provides an image-classifying program comprising the functions for: inputting image information including position information indicating a position where an image was captured; calculating, utilizing the position information, a reference distance between a reference position and the position where the image was captured; and classifying, utilizing a classification condition based on the reference distance, the image to generate a classification result.

According to the program, since the image is classified using the reference distance based on a reference place decided by a user, one or more images that the user recognizes corresponding to an event can be appropriately classified into one group.

A fourteenth aspect of the present invention provides an image-classifying method comprising: defining a distance between a reference position and a position where an image was captured as a reference distance; and registering at least one identifier relating to at least one image that was captured at a position belonging to a predetermined range of the reference distance into a list corresponding to the predetermined range of the reference distance.

According to the method utilizing the list, a user can easily access the image information that is classified into a group.

A fifteenth aspect of the present invention provides an image-classifying method comprising: defining a distance between a reference position and a position where an image was captured as a reference distance; and saving at least one data file relating at least one image that was captured at a position belonging to a predetermined range of the reference distance into a folder corresponding to the predetermined range of the reference distance.

According to the method utilizing the folder, a user can easily view the image information per group at one time.

A sixteenth aspect of the present invention provides an image-classifying method comprising: defining a distance between a reference position and a position where an image was captured as a reference distance; and displaying at least one image that was captured at a position belonging to a predetermined range of the reference distance in a manner different from that of one or more images that do not belong to the predetermined range of the reference distance.

According to the method, one or more images relating to image information belonging to a group are collectively displayed to a user.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 4 is a flowchart of an image-classifying apparatus in the first embodiment of the present invention;

FIG. 5 is an illustration showing a table of shooting information in the first embodiment of the present invention;

FIG. 8 (a) is an illustration showing a table of classification condition equations in the second embodiment of the present invention;

FIG. 8 (b) is an illustration showing a group management table in the second embodiment of the present invention;

FIG. 14 (a) is an illustration showing a table of classification condition equations in the third embodiment of the present invention;

FIG. 14 (b) is an illustration showing a group management table in the third embodiment of the present invention;

FIG. 18 is an illustration showing a table of classification condition equations in the fourth embodiment of the present invention;

DETAILED DESCRIPTION OF THE PREFERRED EMBODIMENTS

Embodiments of the present invention are now described with reference to the accompanying drawings.

First Embodiment

First, an image-classifying apparatus, an image-classifying method, and a program in the first embodiment of the present invention are explained. An image-classifying system of the first embodiment comprises: the image-classifying apparatus; a shooting apparatus; and a display apparatus.

Figure 1:
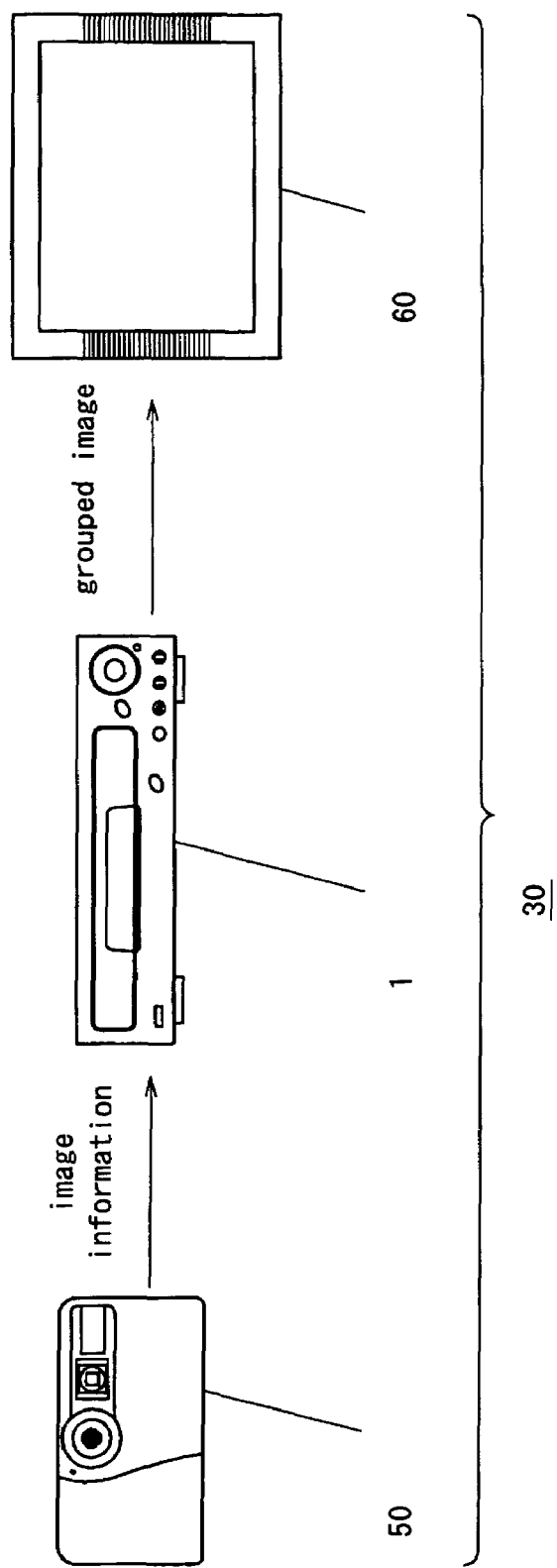
FIG. 1 is a diagram of an image-classifying system in a first embodiment of the present invention.

FIG. 1 is a diagram showing the image-classifying system in the first embodiment of the present invention. As shown in FIG. 1, an image-classifying system 30 in the embodiment of the present invention comprises: a shooting apparatus 50 (e.g. as a digital camera and a movie camera that captures images); an image-classifying apparatus 1 that classifies an image (a still image or a moving image) captured by the shooting apparatus 50; and a display apparatus 60, which displays the image that is classified by the image-classifying apparatus 1.

The image-classifying apparatus 1 can classify the image information for each event by sending image information to the image-classifying apparatus 1 with a medium (e.g. a memory card) or by connecting the shooting apparatus 50 to the image-classifying apparatus 1 with well-known means (e.g. wired or wireless). As a result, a user can check the classified image on the display apparatus 60.

The image information in the first embodiment of the present invention means information including pixel data of a captured image and position information specifying at least a place where the image was captured, which may be obtained from GPS information, for example.

Figure 2:
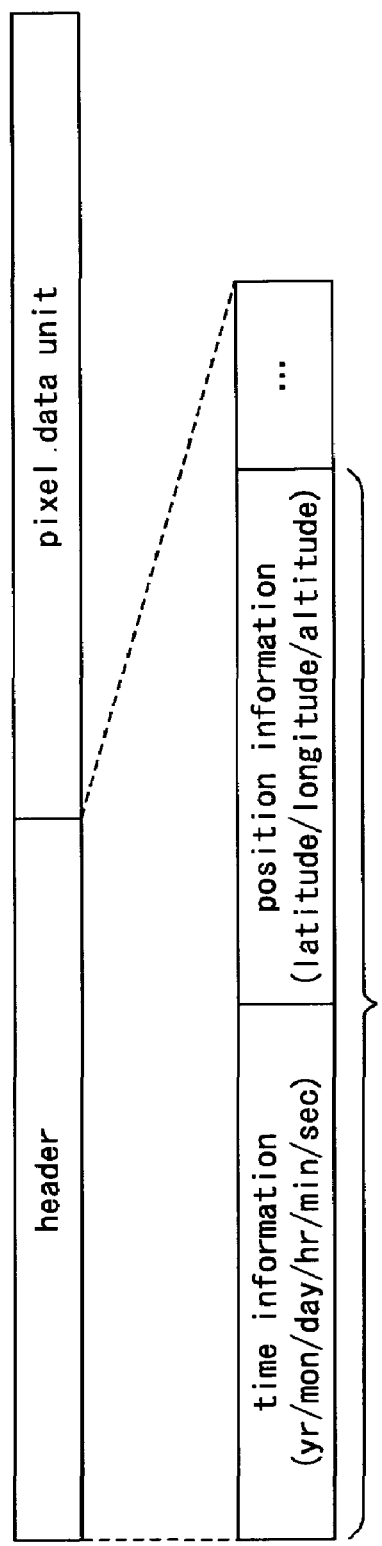
FIG. 2 is an illustration showing a data structure of image information in the first embodiment of the present invention.

FIG. 2 is an illustration showing an example of a data structure of the image information. In the example shown in FIG. 2, the time information of the shooting time (year/month/day/hour/minute/second) when the image was captured, and the position information of the shooting place (latitude/longitude/altitude) where the image was captured (hereinafter, the time information and the position information all together are described as shooting information) are stored in a header of the image information. After the header there is a pixel data portion, storing information such as a brightness value for every pixel which constitutes an image.

An Exif (EXchangeable Image File) is a standard, which can record such shooting information, and a JPEG file and an MPEG file employing Exif can be also used as image information.

The present invention does not limit the order of the time information and the position information in the image information and the order of the header and the pixel data portion. In the first embodiment of the present invention, only the position information needs to be stored in the image information, and the time information does not need to be included.

Figure 3:
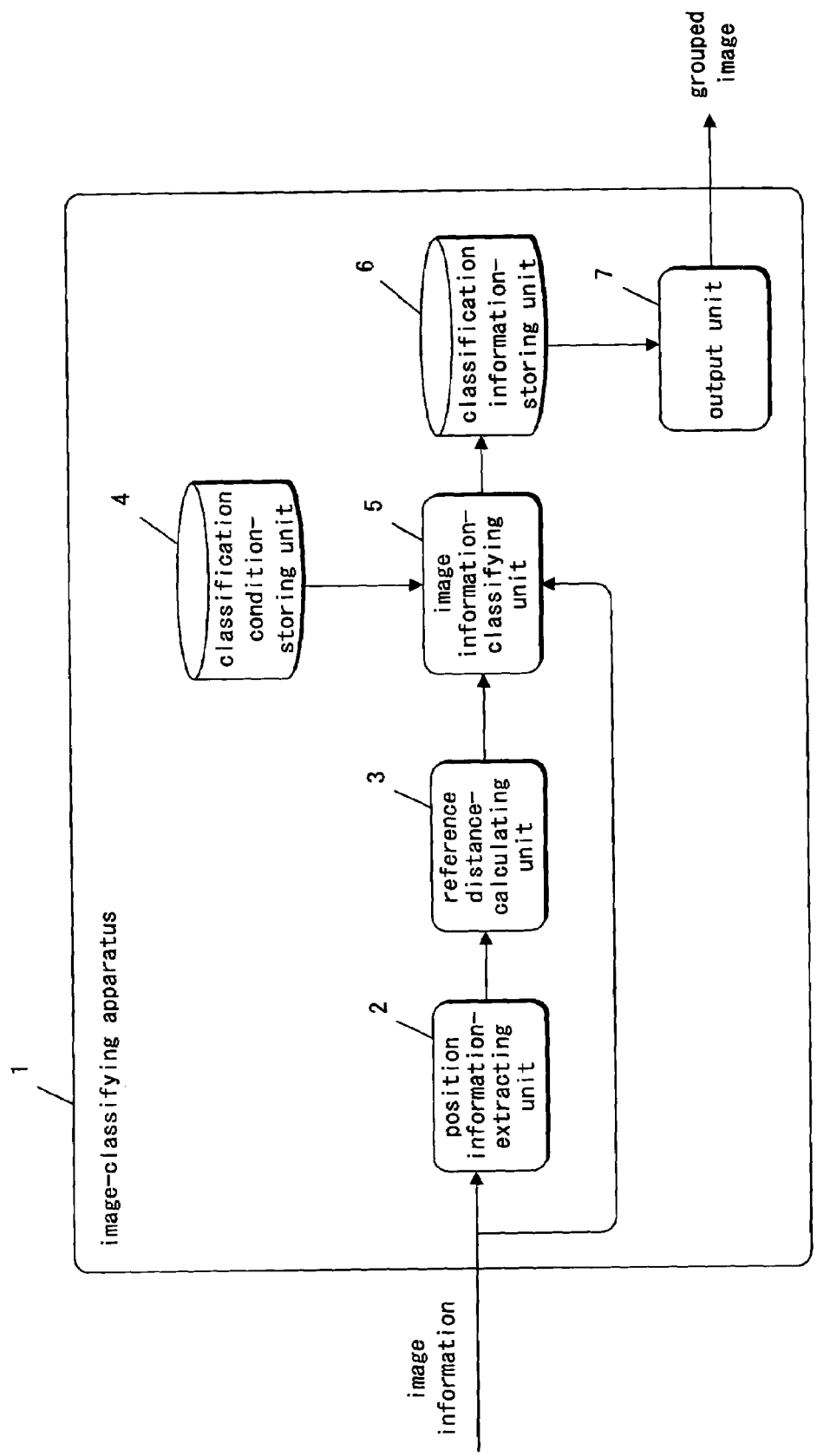
FIG. 3 is a block diagram of an image-classifying apparatus in the first embodiment of the present invention.

Next, the structure of the image-classifying apparatus 1 in the first embodiment of the present invention is explained. FIG. 3 is a block diagram of the image-classifying apparatus 1 in the first embodiment of the present invention.

As shown in FIG. 3, the image-classifying apparatus 1 in the first embodiment of the present invention comprises the following elements. A position information-extracting unit 2 extracts the position information from the image information inputted from a device such as the shooting apparatus 50. A reference distance-calculating unit 3 calculates the reference distance value described later from the position information extracted by the position information-extracting unit 2. A classification condition-storing unit 4 stores classification conditions in order to classify the image information. An image information-classifying unit 5 classifies the image information under the classification conditions stored in the classification condition-storing unit 4, based on the reference distance value calculated by the reference distance-calculating unit 3. A classification information-storing unit 6 stores classification information classified by the image information-classifying unit 5, such as a group ID of the image information. An output unit 7 outputs the grouped images to the display apparatus 60 based on the classification information in the classification information-storing unit 6.

The classification condition-storing unit 4 and the classification information-storing unit 6 can be suitably selected and used from well-known storing means, such as a magnetic disk unit (such as HDD) or a memory card. The classification condition-storing unit 4 and the classification information-storing unit 6 have different functions from each other. Each of the units 4 and 6 may be realized by different means, and functions for classification condition-storing unit 4 and the classification information-storing unit 6 can be realized by different regions of a single recording medium.

In the embodiment of the present invention, "classifying an image" means assigning the image information into a group whose elements correspond thereto. More specifically, "classifying an image" means storing identifier information that specifies the image information belonging to a group or link information showing a position where the image information is stored, moving/copying the image information to a prepared folder for every group, or storing identifier information showing a group in a header of the image information, and so on.

Next, an outline of the operation of the image-classifying apparatus 1 in the first embodiment of the present invention is explained. FIG. 4 is a flowchart of an image-classifying apparatus 1 in the first embodiment of the present invention.

First, image information is inputted into the position information-extracting unit 2 of the image-classifying apparatus 1 from the shooting apparatus 50 (S1).

The position information-extracting unit 2 extracts the position information from the above-mentioned image information (S2).

The reference distance-calculating unit 3 calculates an absolute value (hereinafter, a reference distance Ds) of a distance difference between a predetermined reference place and a place where the image was captured (S3).

The image information-classifying unit 5 determines a group corresponding to the image information under classification conditions stored in the classification condition-storing unit 4, thereby classifying the image information into a group (S4).

A set of image information and the classification result is stored in the classification information-storing unit 6, and is outputted by the output unit 7 to be displayed on the display apparatus 60 in a manner distinguishable for every group (S5).

Next, the detailed processes are explained with an example of the image information.

FIG. 5 illustrates a part of the shooting information of the image information, which is inputted in the image-classifying apparatus 1 in the first embodiment of the present invention. As shown in FIG. 5, assume that in the image-classifying apparatus 1 in the first embodiment of the present invention, 16 frames of image information are inputted from the shooting apparatus 50. It is understood that an image whose image ID (herein, P1-P16) is P1 was captured at the place where 135°30'10" east, 45°10'03" north and the altitude of 30 m, at 5:30:10 on Dec. 24, 2003.

The position information-extracting unit 2 extracts the position information from the above-mentioned image information (S2). As for the image information of P1 the position information of 135°30'20" east, 45°10'03" north and the altitude of 30 m is extracted, and the extracted position information is sent to the reference distance-calculating unit 3.

The reference distance-calculating unit 3 calculates a reference distance Ds (S3).

The reference Ds distance is a distance between a reference point that is predetermined (hereinafter, an original point) and a point where an image was captured (hereinafter, an acquisition point).

When two points are the original point and the acquisition point, the reference distance Ds may be a minimum distance between the two points on a map that is expressed with latitude and longitude, a three-dimensional distance expressed with latitude, longitude and altitude, length (distance) of a route connecting the two points, and distance between landmarks (such as a station and building) neighboring the two points.

Furthermore, the reference distance Ds may be a distance in a straight line between two points located in different two areas. The two areas may be a state, a city or a town.

Distance may be expressed using the time which is needed to move between the above-mentioned two points by transportation, such as "30 minutes by train". In this case, the transition time is comparable with the distance in a straight line on a map. Therefore, the distance becomes a distance that is subjective and is nearly equal to a unit of the user's cognizance.

Although a user can set up the original point arbitrarily, it is assumed that the user's home is the original point in the first embodiment of the present invention.

Setting the original point may be done by the user inputting the original point from an input unit (not shown) or by the user specifying an image as "an image captured at the original point".

A value of the reference distance Ds calculated by the reference distance-calculating unit 3 is sent to the image information-classifying unit 5.

The image information-classifying unit 5 determines a group corresponding to the sent image under the classification conditions stored in the classification condition-storing unit 4, thereby classifying the image information into the group (S4).

In the first embodiment of the present invention, the reference distance threshold is prepared in order to classify an image according to the differences in length of the reference distance Ds under the classification conditions stored in the classification condition-storing unit 4.

For example, when two reference distance thresholds of 5 km and 500 km are prepared according to the differences of the reference distance Ds, the image information can be classified into the following three groups:

$0 \leq Ds \leq 5$ km→G1 (a group of events in the neighborhood);

$5$ km$< Ds \leq 500$ km→G2 (a group of domestic tours); and $500$ km$< Ds \leq 5000$ km→G3 (a group of travels abroad).

The image information-classifying unit 5 compares the classification conditions with the reference distance Ds of each image information, and classifies the image information into an optimal group. Classification of groups which suit the user's cognizance can be performed by determining a range by assigning items of image information in a manner such that as the range becomes greater, the reference distance value Ds becomes greater.

Thus, the classification information, which indicates to which group each image information belongs, is sent to the classification information-storing unit 6 from the image information-classifying unit 5, and is stored therein (S5). In this case, the image can be grouped and outputted to the display apparatus 60, which is externally provided, if it is necessary to check a result thereof.

Thus, the inputted image information is classified based on the reference distance Ds, thereby performing classification that meets a criterion which a user prefers more effectively than in the prior art.

It is possible to classify the images which meet criteria which the user prefers by coding and compiling a program according to the flowchart of FIG. 4, and running the program on a computer. Of course, the program may be stored in a recording medium, and the program may be loaded into a computer to be executed thereon.

Second Embodiment

Next, an image-classifying apparatus, an image-classifying method, and a program in a second embodiment of the present invention are explained.

Figure 6:
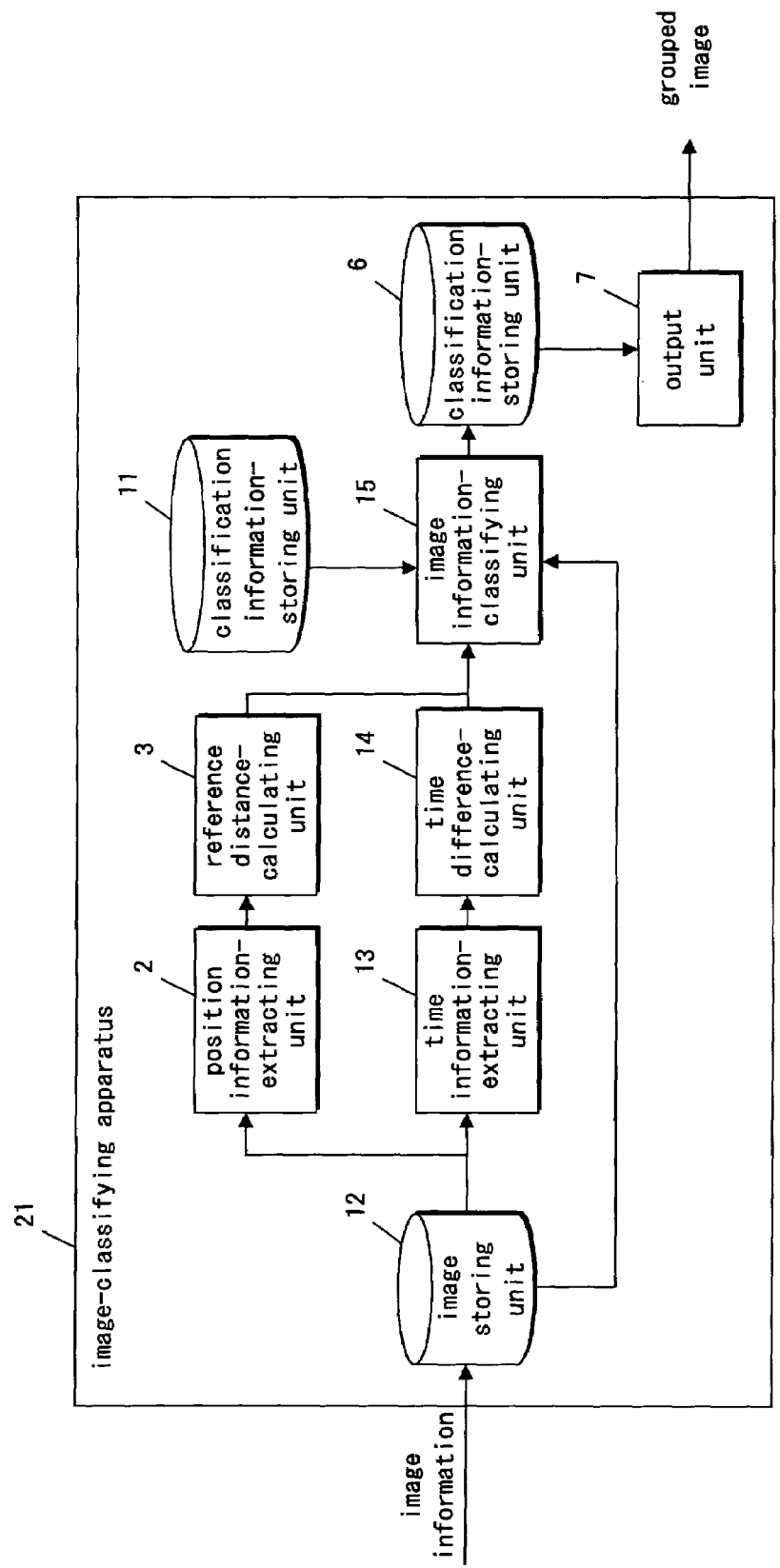
FIG. 6 is a block diagram of an image-classifying apparatus in a second embodiment of the present invention.

FIG. 6 is a block diagram of an image-classifying apparatus 21 in the second embodiment of the present invention.

As shown in FIG. 6, when comparing between the image-classifying apparatus 21 in the second embodiment of the present invention and the image-classifying apparatus 1 of the first embodiment of the present invention, a point of difference is that the image-classifying apparatus 21 in the second embodiment of the present invention comprises: an image storing unit 12 that stores the image information sent from the shooting apparatus 50; a time information-extracting unit 13 that extracts the time information from the shooting information of the image information; and a time difference-calculating unit 14 that calculates the difference between the time when an image was captured and the time when another image was captured immediately before the image (that is, the time difference).

Therefore, the time difference and the value of the reference distance Ds are inputted into an image information-classifying unit 15.

Because of the differences of the structure, processes of the image information-classifying unit 15 and the classification conditions stored in the classification condition-storing unit 11 are different from those explained in the first embodiment, and will be described later.

In the image-classifying apparatus 21 in the second embodiment of the present invention, duplicated descriptions are omitted by giving the same symbols regarding the elements having the same functions as in the image-classifying apparatus 1 explained in the first embodiment.

The image storing unit 12 stores one or more items of image information captured by the shooting apparatus 50 such as a digital camera and a camera-built-in cellular phone. In the second embodiment of the present invention, a header of the image information includes at least the time information indicating when the image was captured and shooting information indicating where the image was captured.

In the present embodiment of the invention, it is assumed that the data which the image storing unit 12 stores is image information. However, the data may follow any format, such as moving image data, music data or audio data.

As explained in the first embodiment, the position information-extracting unit 2 and the reference distance-calculating unit 3 calculate the above-mentioned reference distance Ds from the image information stored in the image storing unit 12.

The time information-extracting unit 13 takes out the time when the image was captured (that is, the time information) from the header of the image information that has been sent from the image storing unit 12.

The time difference-calculating unit 14 calculates an absolute value (hereinafter, a time difference TT) of the time difference between the shooting time of the image that was captured immediately before and the shooting time of the image that is to be classified, and sends the time difference TT to the image information-classifying unit 15.

The classification condition-storing unit 11 stores one or more classification condition equations for classifying images into groups. Although details for the classification condition equations are described later, the classification condition equations include at least one of a condition regarding the time information and a condition regarding the position information.

The image information classifying unit 15 chooses an optimal classification condition equation from the classification condition equations stored in the classification condition-storing unit 11 using the reference distance Ds calculated by the reference distance-calculating unit 3, and the time difference TT calculated by the time difference-calculating unit 14. Then, the image information classifying unit 15 determines, based on the classification condition equations, an appropriate group into which each of the items of image information stored in the image storing unit 12 should be classified. When no appropriate group exists, the image information classifying unit 15 creates a new group and classifies the image information into the new group.

The classification information-storing unit 6 stores a group and a storing place (pointer information) indicating where image information belonging to the group is stored in a manner such that the group and the storing place relate to each other. Folders each corresponding to a group may be prepared in the classification information-storing unit 6, and the image information belonging to the group may be moved and copied from the image storing unit 12 to one of the folders.

It is preferable that each of the image storing unit 12, the classification condition-storing unit 11, and the classification information-storing unit 6 is composed of a nonvolatile recording medium such as hard disk, DVD media or semiconductor memory card. However, a volatile recording medium may be also used. The storing units may be provided in single recording medium.

Figure 7B:
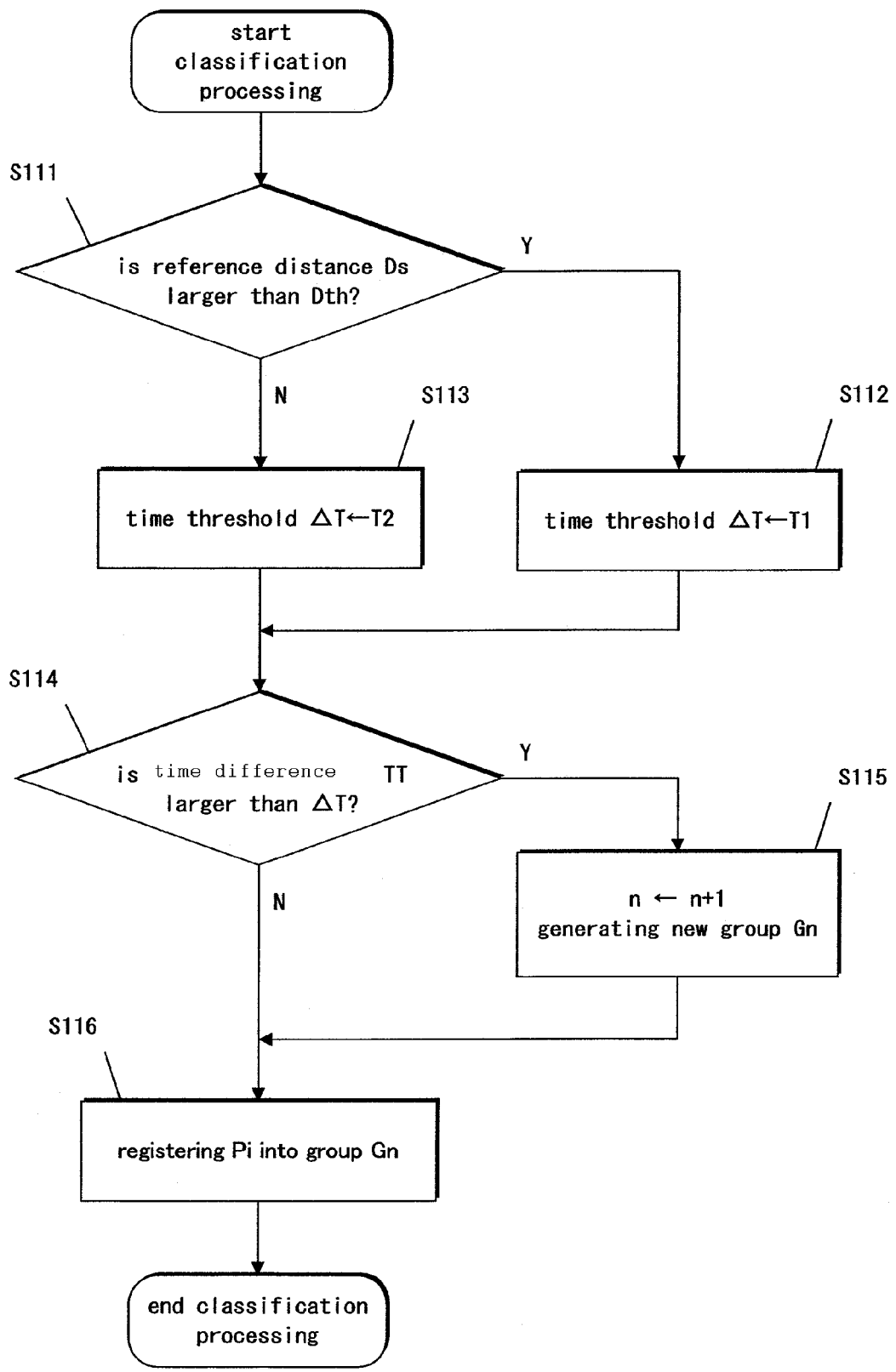
FIGS. 7 (a) and (b) are flowcharts of an image-classifying apparatus in the second embodiment of the present invention.

Next, an outline of the operation of the image-classifying apparatus 21 in the second embodiment of the present invention is explained. FIG. 7 is a flowchart of the image-classifying apparatus 21 in the second embodiment of the present invention.

In the image-classifying apparatus 21 in the second embodiment of the present invention, one or more items of image information captured by the shooting apparatus 50, is saved beforehand in the image storing unit 12 as one or more files, and the number of the files is stored in a variable pnum. These items of image information is distinguished from each other as P1-Pnum, respectively.

First, initialization of the image-classifying apparatus 21 is performed (S11). Initialization is an operation that registers the original point when calculating the value of the reference distance Ds. This is usually performed by a user by inputting the original point, and declaring that an image, which was captured at the original point, is the image captured at the place where the standard should be (for example, home).

Next, a value of 1 is stored in a variable n that counts a group number (S12), and a new group Gn (that is a group G1) is created in the classification information-storing unit 6. Step S14 is repeated pnum times, as an image information loop A (S13). At this time, assume that a variable i is used as a loop counter.

As for processes of the image information loop A, the position information-extracting unit 2 takes out the position information from a header of image information Pi first. The reference distance-calculating unit 3 calculates the reference distance Ds based on the position information (S14).

After the above-mentioned image information loop A processes have been performed for all of the image information P1-Pnum, the image information-classifying unit 15 stores in a variable Dsm a maximum value of the reference distance Ds calculated for each image information (S15).

The image information-classifying unit 15 selects a classification condition equation corresponding to the maximum Dsm from the classification condition-storing unit 11, and determines classification equation parameters, which should be used for the classification (S16). In the present embodiment, it is assumed that the classification conditions, which are shown in Steps S111-S116, are selected.

Steps S18 and S19 are repeated pnum times, as an image information loop B (S17). In the image information loop B, assume that the variable i is used as a loop counter.

The position information-extracting unit 2 extracts the position information from a header of the image information Pi, and the time information-extracting unit 13 takes out the time information from the header of the image information Pi. The reference distance-calculating unit 3 calculates the reference distance Ds. The time difference-calculating unit 14 calculates the time difference TT (S18).

The time difference TT is an absolute value of the difference between the shooting time of the image information Pi and the shooting time of the image information Pi−1 that was captured immediately before. The time difference TT is equal to a value of 0 in an image for which the processing is performed first (when i=1).

Next, the image information-classifying unit 15 classifies the image information Pi into a group according to the classification condition equation read in from the classification condition-storing unit 11 (S19). The details of the processing are further explained referring to FIG. 7 (*b*).

In certain image information Pi, when the reference distance Ds is greater than the distance threshold Dth (for example, a long distance from home), a value T1 is stored in the time threshold ΔT, and otherwise (short distance from home), a value T2 is stored in the time threshold ΔT (S111-S113).

Next, when the time difference TT, which is read in, is greater than the time threshold ΔT (S114), a new group Gn+1 is created in the classification information-storing unit 6, and the image information P1 is classified into the new group Gn+1 (S115).

In Step S114, when the time difference TT is less than the time threshold ΔT, the image information Pi is classified into the existing group Gn, and the processing (S116) is ended.

Here, operation of the image-classifying apparatus in the second embodiment of the present invention is further explained with a specific example.

The image information stored in the image storing unit 12 is the same image information shown in FIG. 2, and the image information includes a header and a pixel data portion.

As mentioned above, the header stores the shooting information including the position information. Values of pixels composing an image are stored in the pixel data portion. When the header of the image information is read, the time and the place where the image was captured can be known.

In this example, the time information indicates the time when a button is pressed, in a format of "year/month/day/hour/minute/second". The time information may not be limited to this example. The time information may be composed of an elapsed time from a certain reference time to the shooting time.

Furthermore, the position information of the shooting place indicates the shooting place where the button is pressed, in a format of "latitude (degree, minute, second)/longitude (degree, minute, second)/altitude)". The position information may not be limited to this example. The position information may be composed of information indicating a relative position from a reference position.

FIG. 8 (a) illustrates an example of classification condition equations stored in the classification condition-storing unit 11.

As shown in FIG. 8(a), the classification condition equations hold one or more records each comprising fields of "classification condition equation ID", "selection condition", and "classification equation parameter".

The field of "classification condition equation ID" stores information for identifying each record, and is given for the request on management.

The field of "selection condition" stores a condition for selecting an optimal equation for the image information Pi from the classification condition equations, and is expressed by the difference of a maximum DSM of the above-mentioned reference distance Ds.

The field of "classification equation parameter" stores parameter information used by the classification condition equations, and includes the distance threshold Dth and the time threshold ΔT.

Herein, details of the operation are explained using an example that a user has captured 16 frames of images in one day.

Assume that 16 items of image information relating to the images have been stored in the image storing unit 12, and the 16 items of image information are numbered as image information P1-P16 in an order of shooting time. It is also assumed that the original point is the user's home.

Figure 9:
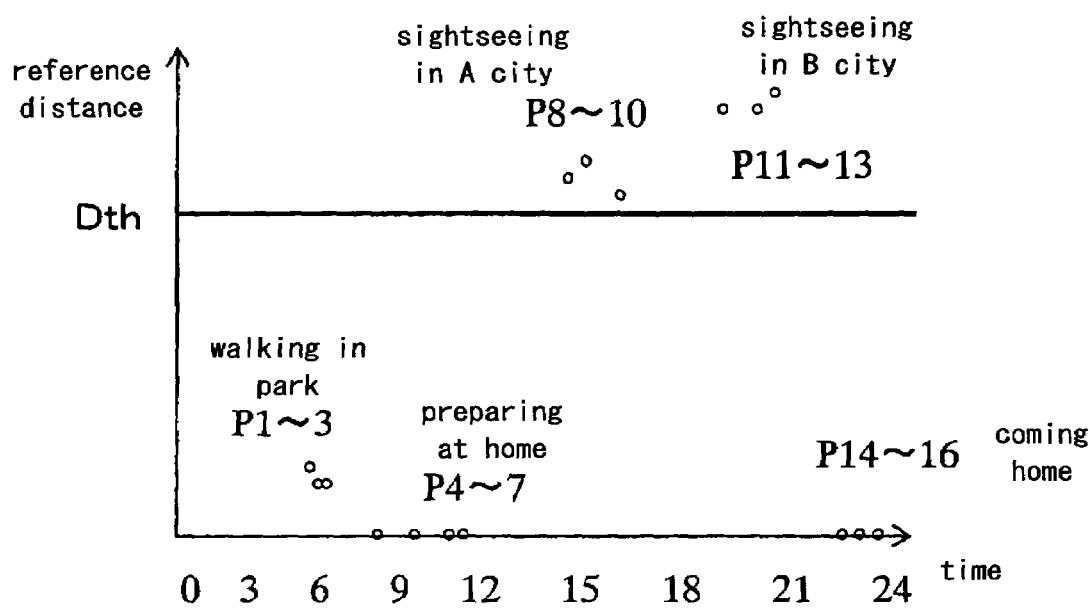
FIG. 9 is a graph showing a relationship between time and distance in the second embodiment of the present invention.

A horizontal axis of FIG. 9 indicates time when the images were captured, and a vertical axis of FIG. 9 indicates the reference distance Ds.

As shown in FIG. 9, the image information P1-P3 are captured when the user goes for a walk in a park near home, the image information P4-P7 are captured when the user is preparing at home for sightseeing, the image information P8-P10 are captured when the user is sightseeing in city A, the image information P11-P13 are captured when the user is sightseeing in city B after sightseeing in city A, and the image information P14-P16 are captured when the user comes home.

When the 16 items of image information are inputted, the image-classifying apparatus 21 performs processes as indicated in the above-mentioned FIG. 7 (a).

A first group G1 is created at Step S12, and the maximum value Dsm of the reference distance Ds is determined at Steps S13-S15. It is assumed that the maximum value Dsm is 22 km (Dsm=22 km) in this example.

At Step S16, a record, which includes the maximum value Dsm in the selection condition, is selected from all the records of the classification condition table shown in FIG. 8 (a), and the classification equation parameter of the selected record is read. Since the maximum value Dsm of the image information P1-P16 is 22 km, a classification condition equation whose ID is B1 is selected, and the classification equation parameters (distance threshold Dth=20 km, time threshold T1=60 minutes, and time threshold T2=90 minutes) are read.

Step S19 is executed using the classification equation parameters.

With respect to all image information Pi, when the value of the reference distance Ds is greater than the distance threshold Dth, the time threshold T2 is used, and when the value of the reference distance Ds is less than the distance threshold Dth, the time threshold T1 is used. Thereby, all image information Pi is classified into a corresponding group.

In the above-mentioned example, when an image was captured at a short distance less than the distance threshold Dth=20 km (the image information P1-P7 and P14-16), the image information is classified into a group before the time threshold T1=60 minutes and a group after the time threshold T1=60 minutes. And, when an image was captured at a long distance greater than the distance threshold Dth=20 km (the image information P8-P13), the image information is classified into a group before the time threshold T2=90 minutes and a group after the time threshold T2=90 minutes.

For example, since the time difference TT between the image information P1 and P2, and the time difference TT between the image information P2 and P3 are less than 60 minutes, respectively, the image information P1-P3 is classified into the same group G1. Since the time difference TT between the image information P3 and P4 is greater than 60 minutes, a new group G2 is created and the image information P4 is classified into the group G2.

Since the time difference TT between the image information P4 and P5, the time difference TT between the image information P5 and P6, and the time difference TT between the image information P6 and P7 are less than 60 minutes, respectively, the image information P5-P7 is classified into the same group G2 as that of the image information P4.

Since the time difference TT between the image information P7 and P8 is greater than 90 minutes, a new group G3 is created, and the image information P8 is classified into the group G3.

Since the time difference TT between the image information P8 and P9, and the time difference TT between the image information P9 and P10 are less than 90 minutes, respectively, the image information P9 and P10 is classified into the same group G3. Since the time difference TT between the image information P10 and P11 is greater than 90 minutes, a new group G4 is created, and the image information P11 is classified into the new group G4.

Since the time difference TT between the image information P11 and P12, and the time difference TT between the image information P12 and P13 are less than 90 minutes, respectively, the image information P12 and P13 is classified into the same group G4 as that of the image information P11.

Since the time difference TT between the image information P13 and P14 is greater than 60 minutes, a new group G5 is created, and the image information P14 is classified into the new group G5.

Since the time difference TT between the image information P14 and P15, and the time difference TT between the image information P15 and P16 are less than 60 minutes, respectively, the image information P14 and P15 is classified into the same group G5.

As a result of the above processes, a group management table as illustrated in FIG. 8 (b) is stored in the classification information-storing unit 6, and classification into the image information P1 through P16 has been completed.

FIG. 8 (*b*) illustrates an example of the group management table stored in the classification information-storing unit 6. As shown in FIG. 8 (*b*), the group management table comprises one or more records each comprising fields of a "group ID" and an "image ID".

The field of "group ID" stores information for identifying each record, and is given for the request on management.

The field of "image ID" stores an identifier for specifying one or more images belonging to a group. The identifier may be link information, for example. Referring to this link information, a specific item of image information stored in the image-storing unit 12 can be accessed. The identifier may be also a unique serial number which does not overlap any other and is distinguishable from any other.

As mentioned above, when image information has been classified, image information may be moved and/or copied into a folder corresponding to a group into which the image information is classified, or identification information indicating a group into which the image information is classified may be stored in a header of the image information.

Figure 10:
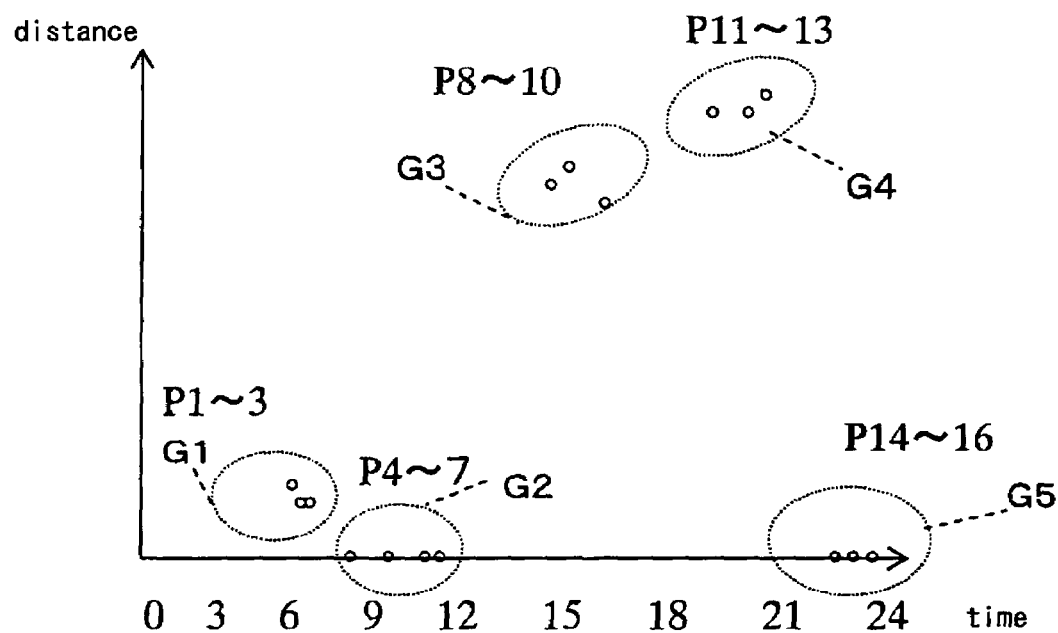
FIG. 10 is a graph showing a group classification result in the second embodiment of the present invention.

According to the processes as shown in FIG. 10, image information of the image information P1 through P16 can be rightly classified into five groups. The image information P1 through P3 whose images were captured while walking in a park is classified into the group G1. The image information P4 through P7 whose images were captured while preparing for the sightseeing at home is classified into the group G2. The image information P8 through P10 whose images were captured while sightseeing in city A is classified into the group G3. The image information P11 through P13 whose images were captured while sightseeing in city B is classified into the group G4. The image information P14 through P16 whose images were captured after coming back home is classified into the group G5. In other words, the image information P1 through P16 can be appropriately classified into five events, precisely reflecting the user's action of one day.

In this embodiment, an example utilizing the classification condition equation ID=B1 is described. A classification equation parameter of the distance thresholds Dth divides reference distances from a reference point into two categories of a "short distance" and a "long distance" to generate a divided result, the divided result is further divided applying two time thresholds $\Delta T$ (T1 and T2) to generate a classification result.

However, the present invention is not limited to the above example. For example, as shown in the classification condition equations B2 and B3 of FIG. 8 (*a*), two or more distance thresholds Dth (e.g. Dth1 and Dth2) may be provided and the reference distances from the reference point may be divided into three or more categories of a "short distance", a "middle distance", a "long distance", and so on, to generate a divided result. The divided result may be further divided by applying three or more thresholds $\Delta T$ (e.g. T1, T2, and T3) to generate a classification result. Similarly, the reference distances Ds can be divided into four or more categories and each different time threshold $\Delta T$ may be also applied.

Figure 11:
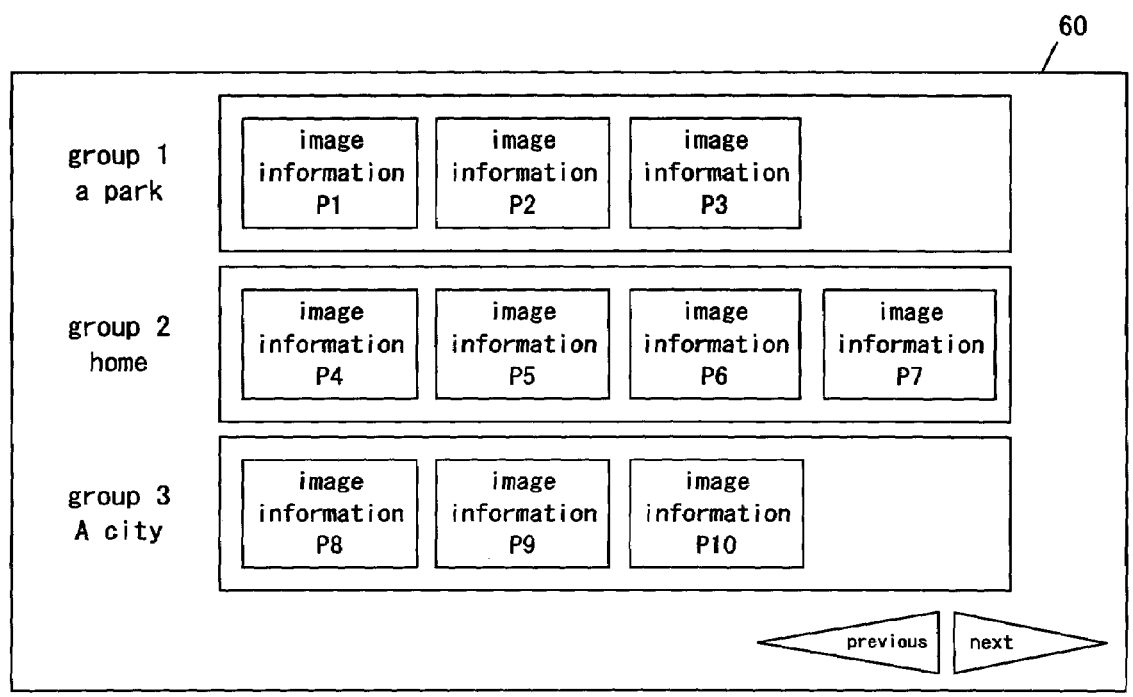
FIG. 11 is an illustration showing a display image in the second embodiment of the present invention.

As shown in FIG. 11, since the image information P1 through P16 classified in the above method can be displayed at the display apparatus 60 via the output unit 7 for every group, a user can collectively view many images for any event in a short period of time without increasing the user's burden.

FIG. 11 illustrates a display example on the display apparatus 60 of the image-classifying apparatus and the image-classifying system of the embodiment of the present invention. As shown in FIG. 11, thumbnail images illustrating outlines of the image information from the image information P1 through P10 are collectively displayed for every group.

Utilizing the image-classifying apparatus, image-classifying system, and the image-classifying method according to the embodiment of the present invention, a user can view desired images in a short period of time by selecting one or more desired groups without feeling a burden.

It is possible to correctly classify the images which meet the user's criteria, by coding and compiling a program according to the flowchart shown in FIG. 7, and running the program on a computer. Of course, the program may be stored in a recording medium, and the program may be loaded into a computer to be executed thereon.

Third Embodiment

Figure 12:
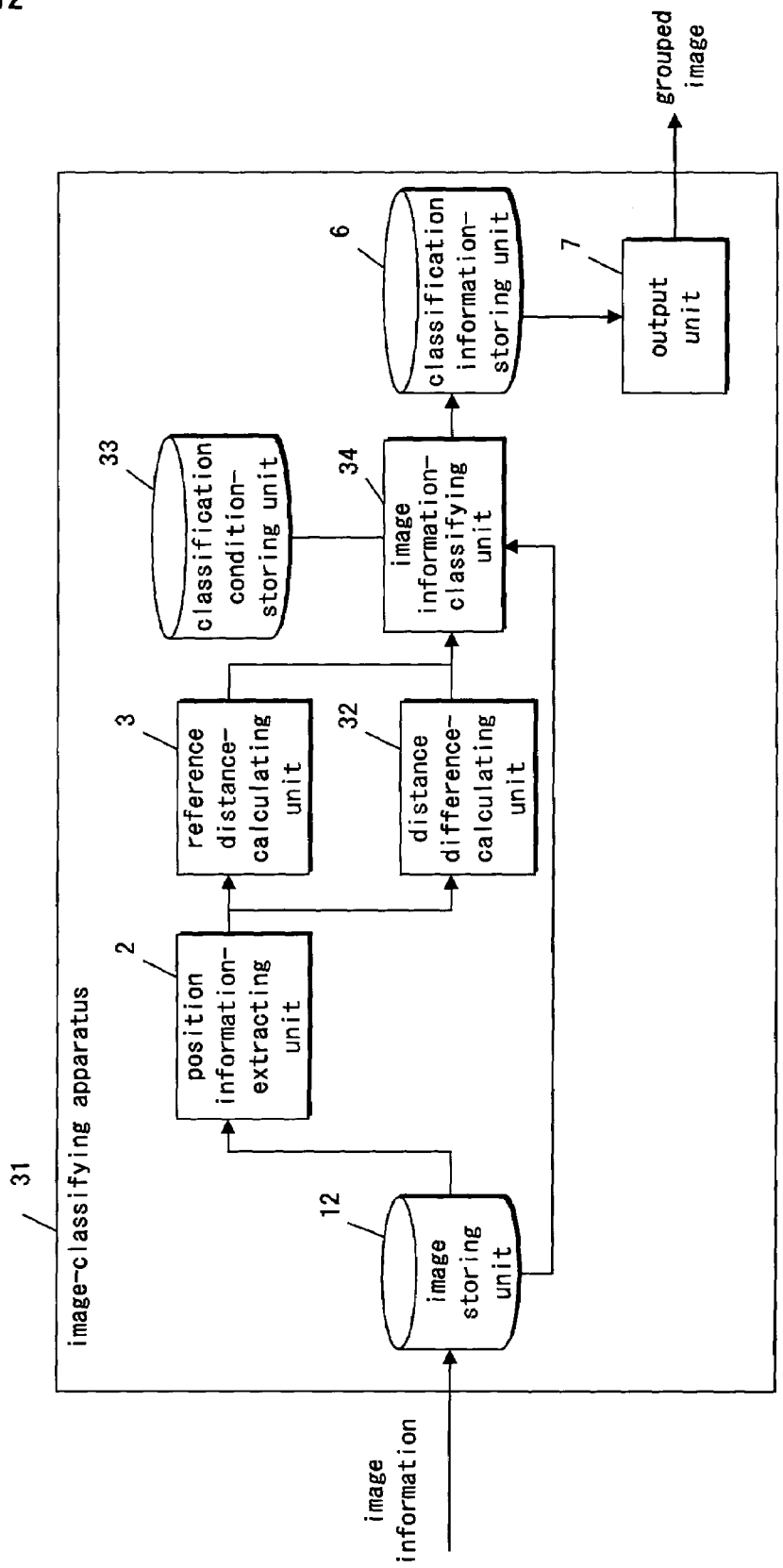
FIG. 12 is a block diagram showing an image-classifying apparatus in a third embodiment of the present invention.

An image-classifying apparatus 31 of a third embodiment of the present invention is described. FIG. 12 is a block diagram of the image-classifying apparatus 31 according to the third embodiment of the present invention.

As illustrated in FIG. 12, some points of difference between the image-classifying apparatus 21 according to the second embodiment of the present invention and the image-classifying apparatus 31 according to the third embodiment of the present invention are as follows. The image-classifying apparatus 31 does not comprise: the time information-extracting unit 13; and the time difference-calculating unit 14. However, the image-classifying apparatus 31 comprises: the distance difference-calculating unit 32 that calculates a distance difference based on position information extracted by the position information-extracting unit 2.

According to the points mentioned above, the image information-classifying unit 34 inputs a value of the reference distance outputted from the reference distance-calculating unit 3 and a value of a distance difference outputted from the distance difference-calculating unit 32 for every image information. Therefore, functions of the image information-classifying unit 34 and classification conditions stored in the classification condition-storing unit 33 are different from those of the image-classifying apparatus 21 in the second embodiment.

To omit duplicated explanation, the same symbols as the image-classifying apparatus 21 are given to the same elements of the image-classifying apparatus 31 in the third embodiment of the present invention as those of image-classifying apparatus 21 in the second embodiment.

The distance difference-calculating unit 32 calculates an absolute value (hereinafter, a distance difference DD) of a distance difference between the shooting location of image information which should be classified and the shooting location of the image information which was captured immediately before, utilizing the position information extracted by the position information-extracting unit 2.

Figure 13:
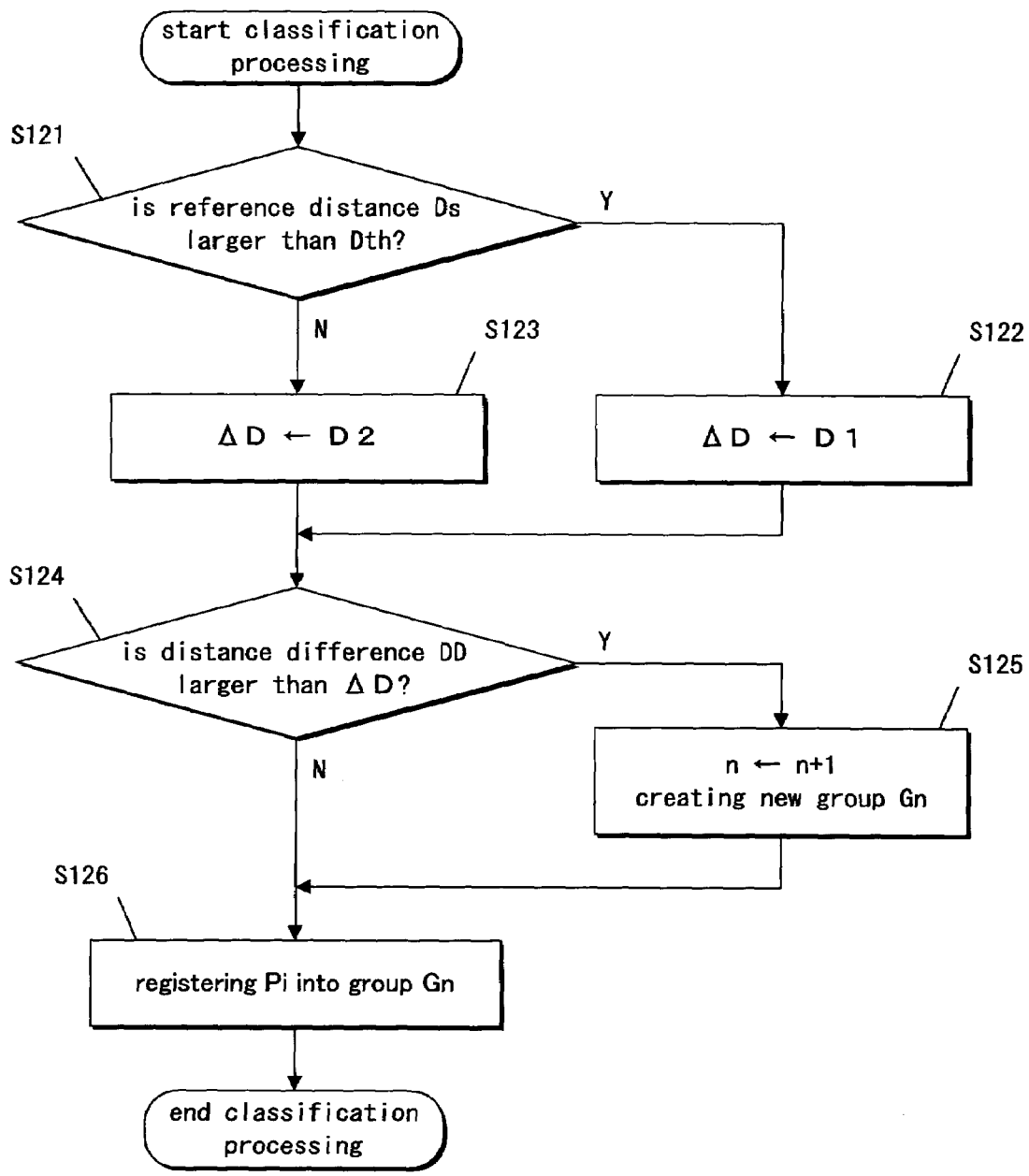
FIG. 13 is a flowchart of an image-classifying apparatus in the third embodiment of the present invention.

Hereinafter, operation of the image-classifying apparatus 31 according to the third embodiment of the present invention is described utilizing flowcharts of FIG. 7 (*a*) and FIG. 13. FIG. 13 corresponds to FIG. 7(*b*) in the second embodiment.

In the third embodiment, assume that the same image information as the second embodiment is inputted into the image-classifying apparatus 31.

Since steps S11 through S15 in FIG. 7 (*a*) are the same as those of the second embodiment, explanation thereof is omitted.

In step S16, the image information-classifying unit 34 selects a classification condition equation corresponding to image information Pi from the classification condition-storing unit 33, and determines a distance threshold and an interval threshold. In this embodiment, assume that a classification condition indicated in steps S121 through S126 according to the flowchart of FIG. 13 is selected.

In FIG. 13, when a reference distance Ds in image information Pi is greater than a distance threshold Dth (when a distance from home is comparatively long), a value of D1 is stored in a location threshold ΔD, and otherwise (when a distance from home is comparatively short), a value of D2 is stored in the location threshold ΔD (S121 through S123).

When a distance difference DD in image information is greater than the location threshold ΔD (S124), a new group Gn+1 is created in the classification information-storing unit 6 (S125), and image information Pi is classified into the new group Gn+1. Otherwise, the image information Pi is classified into an existing group Gn (S126).

Hereinafter, processes of the image-classifying apparatus 31 according to the third embodiment of the present invention are described further in detail. The structure of image information and the image information P1 through P16 which are inputted into the image-classifying apparatus 31 are the same those of the second embodiment.

FIG. 14 (a) illustrates an example of a classification condition equation stored in the classification condition-storing unit 33. Herein, information of a "classification equation parameter" is parameter information utilized in the classification condition equation, and a value of a distance difference threshold ΔD corresponding to the distance threshold Dth is stored therein.

The image storing unit 12 stores sixteen frames of image information as shown in FIG. 9. Images of the sixteen frames have been captured in the same condition as that of the second embodiment.

Figure 15:
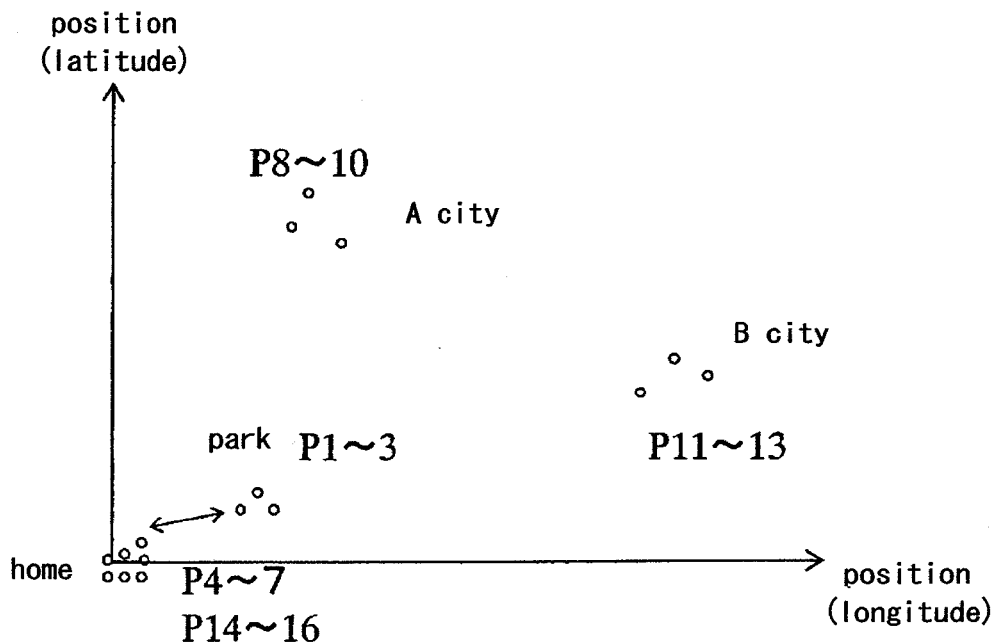
FIG. 15 is a graph showing a relationship between longitude and latitude in the third embodiment of the present invention.

A horizontal axis of FIG. 15 indicates longitude, and a vertical axis of FIG. 15 indicates latitude. Small circle symbols indicating items of the image information P1 through P16 are plotted on FIG. 15. FIG. 15 illustrates geographical positional relationships between a park, home, city A, and city B.

When the sixteen frames of image information shown in FIG. 15 are inputted, the image information-classifying unit 34 creates a first group G1 at the above-mentioned step S12, and calculates a maximum Dsm of a reference distance Ds at steps S13 through S15.

At step S16, the image information-classifying unit 34 selects a record (classification condition equation) whose selection condition includes the maximum Dsm from all the records of a classification condition table, and reads a classification equation parameter of the selected record. Since the maximum Dsm=22 km, a classification condition equation whose classification condition equation ID=B1 is selected, and a reference distance threshold Dth=20 km, a distance difference threshold D1=100 m, and D2=1 km are read into the image information-classifying unit 34.

Step S17 is executed utilizing the above-mentioned classification equation parameters. That is, when an image was captured in a neighborhood with a reference distance threshold less than 20 km (the image information P1 through P7, P14 through P16), the image information are classified into one of two groups divided by a border on the distance difference threshold D1=100 m. When an image was captured in a place with a reference distance threshold greater than 20 km (the image information P8 through P13), the image information are classified into one of two groups divided by a border on the distance difference threshold D2=1 km.

Since a distance difference DD of the image information P1 and P2, and a distance difference DD of the image information P2 and P3 is less than 100 m, the image information P1 through P3 is classified into the same group G1.

Since a distance difference DD of the image information P3 and P4 is greater than 100 m, a new group G2 is created, and the image information P4 is classified into the new group G2.

Since a distance difference DD of the image information P4 and P5, and a distance difference DD of the image information P5 and P6, and a distance difference DD of the image information P6 and P7 are less than 100 m, respectively, the image information P5 through P7 is classified into the same group G2 as the image information P4.

Since a distance difference DD of the image information P7 and P8 is greater than 1 km, a new group G3 is created, and the image information P8 is classified into the new group G3.

A distance difference DD of the image information P8 and P9, a distance difference DD of the image information P9 and P10, a distance difference DD of the image information P10 and P11, a distance difference DD of the image information P11 and P12, and a distance difference DD of the image information P12 and P13, which range over city A and city B, is classified into the same group 3 because the distance differences DD are less than 1 km, respectively.

Since a distance difference DD of the image information P13 and P14 is greater than 100 m, a new group G4 is created, and the image information P14 is classified into the new group G4.

Since a distance difference DD of the image information P14 and P15 and a distance difference DD of the image information P15 and P16 are less than 100 m, the image information P15 and P16 is classified into the same group G4 as the image information P14.

As a result of the above processes, a group management table as illustrated in FIG. 14(b) has been stored in the classification information-storing unit 6.

FIG. 14(b) illustrates an example of a group management table stored in the classification information-storing unit 6. As shown in FIG. 14(b), the group management table comprises one or more records each including fields of a "group ID" and an "image ID".

The field of "group ID" stores information for identifying each record, and is given for the request on management.

The field of "image ID" stores an identifier for specifying one or more images belonging to a group. The identifier may be link information, for example. Referring to this link information, a specific item of image information stored in the image-storing unit 12 can be accessed. The identifier may also be a unique serial number which does not overlap any other and is distinguishable from any other.

As mentioned above, when image information has been classified, image information may be moved and/or copied into a folder corresponding to a group into which the image information is classified, or identification information indicating a group into which the image information is classified may be stored in a header of the image information.

Figure 16:
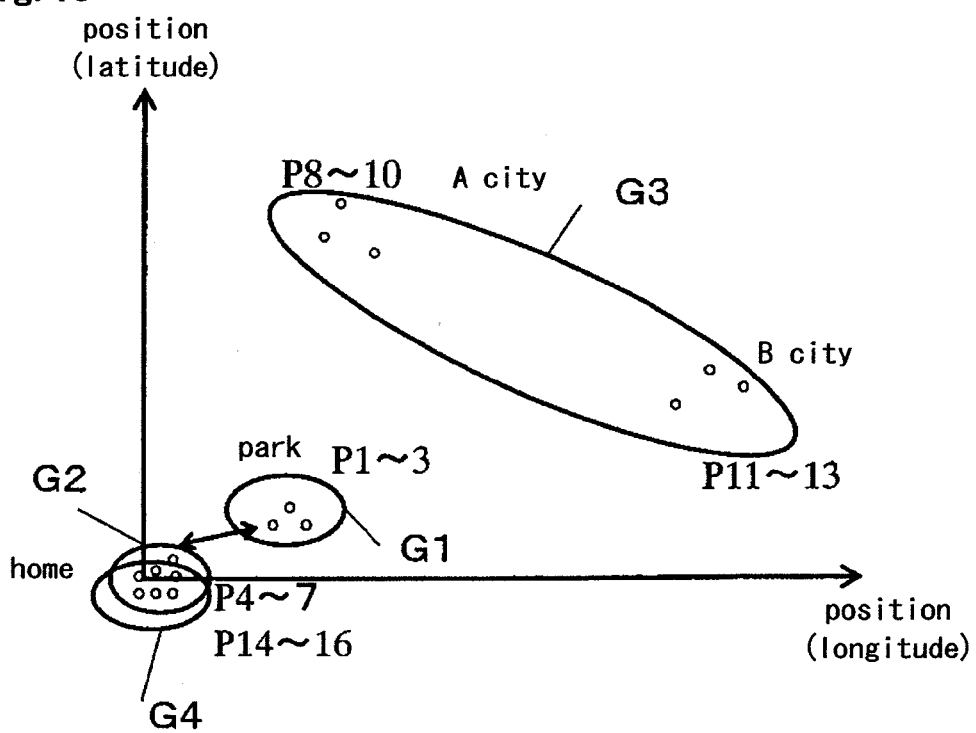
FIG. 16 is a graph showing a group classification result in the third embodiment of the present invention.

As a result, as shown in FIG. 16, an event of a walk in a "park" is classified into the group G1, an event of sightseeing preparation at "home" is classified into the Group G2, an event of sightseeing in "city A and city B" is classified into the group G3, and an event of "after coming back home" is classified into the group G4. Thereby, action in a day of the user can be classified into the four events.

In the third embodiment, an example using the classification condition equation B1, that is, distances from the original point (home) are divided into one of two categories of a "short distance" and a "long distance" referring the reference distance threshold Dth, and image information is classified utilizing two distance difference thresholds ΔD each corresponding to the two categories. However the present invention is not limited to this. For example, as shown in the classification condition equations B2 and B3, two or more distance thresholds Dth (e.g. Dth1 and Dth2) may be provided and the reference distances from the reference point may be divided into three or more categories of a "short distance", a "middle distance", a "long distance", and so on, to generate a divided result. The divided result may further divided applying three or more thresholds ΔD (e.g. D1, D2, and D3) to generate a classification result. Similarly, the reference distances Ds can be divided into four or more categories and each different time threshold ΔT may be also applied.

It is possible to correctly classify images based on the user's criteria, by coding and compiling a program according to the flowchart shown in FIG. 7 (a) and FIG. 13 of the third embodiment, and running the program on a computer. Of course, the program may be stored in a recording medium, and the program may be loaded into a computer to be executed thereon.

Fourth Embodiment

Figure 17:
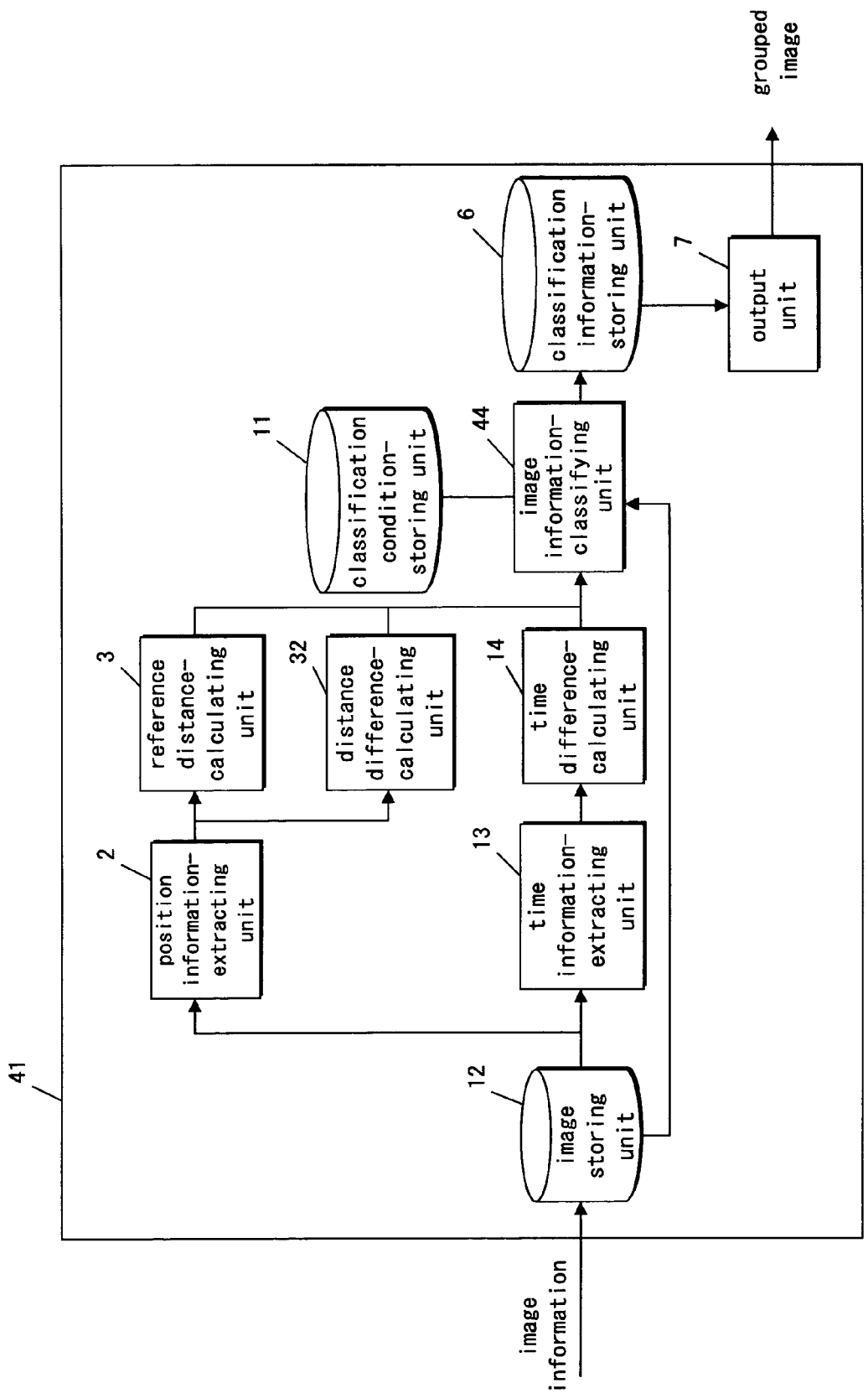
FIG. 17 is a block diagram of an image-classifying apparatus in a fourth embodiment of the present invention.

An image-classifying apparatus 41 in a fourth embodiment of the present invention is described. FIG. 17 is a block diagram of the image-classifying apparatus 41 according to the fourth embodiment of the present invention.

As illustrated in FIG. 17, the image-classifying apparatus 41 in the fourth embodiment of the present invention is almost a combination of the image-classifying apparatus 21 in the second embodiment and the image-classifying apparatus 31 in the third embodiment.

In a view based on the image-classifying apparatus 31 in the third embodiment, the image-classifying apparatus 41 further comprises: the time information-extracting unit 13 in the second embodiment; and the time difference-calculating unit 14 in the second embodiment, each being included in the image-classifying apparatus 21 in the second embodiment.

With this structure, three values for one item of image information Pi are sent to the image information-classifying unit 44. The three values are a value of the reference distance Ds sent from the reference distance-calculating unit 3, a value of the distance difference DD sent from the distance difference-calculating unit 32, and a value of the time difference TT sent from the time difference-calculating unit 14.

The classification condition-storing unit 43 stores a classification condition equation as shown in FIG. 18, and stores, for one classification condition, classification equation parameters relating to each other, which are a reference distance threshold Dth, a value of the distance threshold DD, and a value of a time threshold TT.

Figure 19:
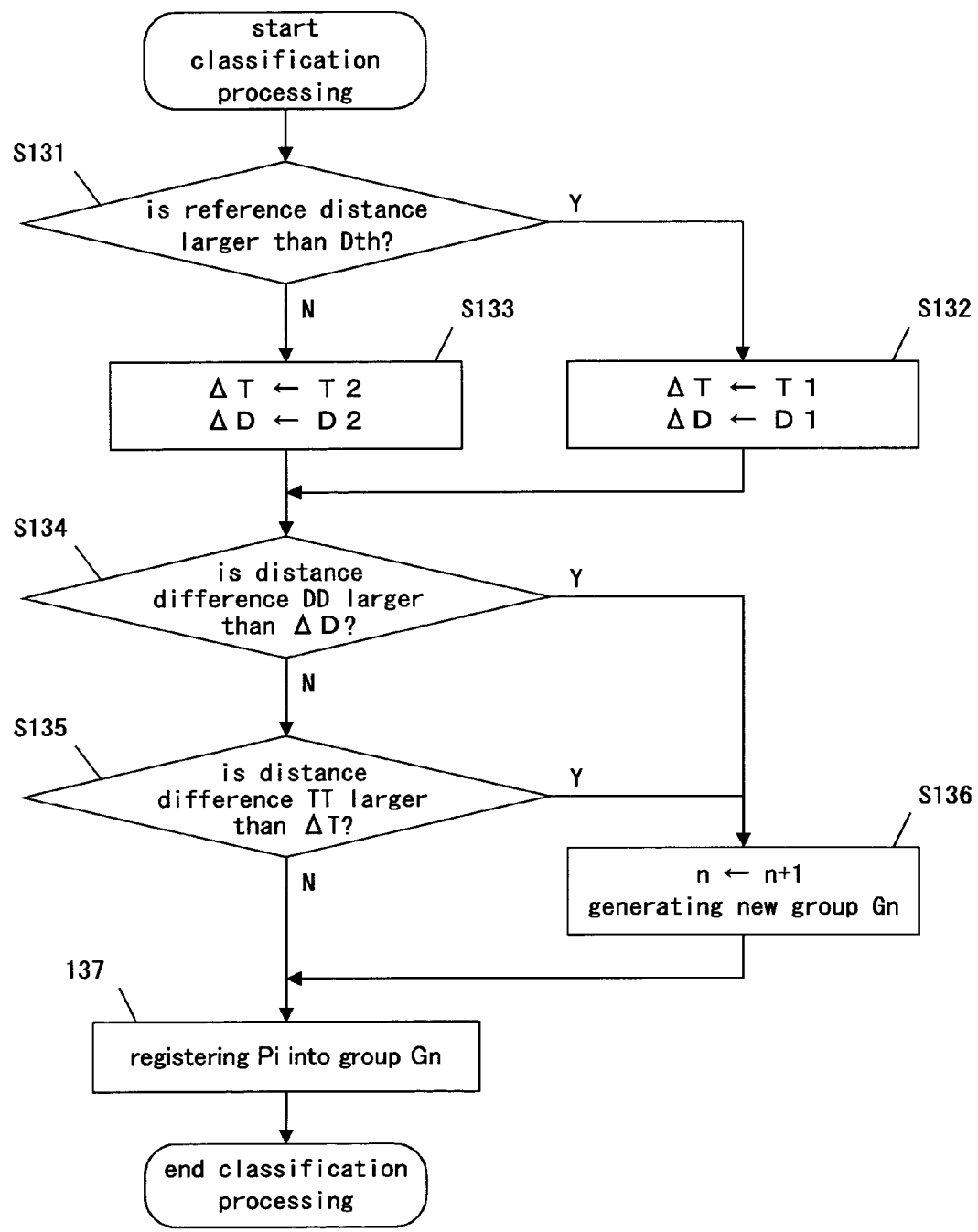
FIG. 19 is a flowchart of an image-classifying apparatus in the fourth embodiment of the present invention.

The image information-classifying unit 44 executes steps as indicated in FIG. 7(a) and FIG. 19, utilizing the three items of information regarding the image information Pi and the classification condition equation stored in the classification condition-storing unit 43.

As shown in FIG. 7(a), the image information-classifying unit 44 in the fourth embodiment of the present invention calculates a maximum Dsm of the reference distance Ds of the image information Pi (S15), the image information-classifying unit 44 selects a suitable classification condition equation suitable from the classification condition equations in FIG. 18, and the image information-classifying unit 44 reads the classification equation parameters from the classification condition-storing unit 43 (S16).

Next, as shown in FIG. 19, depending on whether or not the reference distance Ds of image information Pi is greater than the reference distance threshold Dth, a time threshold ΔT and a distance difference threshold ΔD to be applied are determined (S131 through S133). When the distance difference DD is greater than the difference threshold ΔD (S134) or the time difference TT is greater than the time threshold ΔT (S135), a new group Gn+1 is created (S136) and the image information Pi is classified into the new group Gn+1, and processes are ended.

When the distance difference DD is not greater than the distance threshold ΔD and the time difference TT is not greater than the time threshold ΔT, the image information Pi is classified into the existing group Gn, and processes (S137) are ended.

According to the image-classifying apparatus 41 in the fourth embodiment of the present invention, classifying for every event can be performed further in detail.

Figure 20:
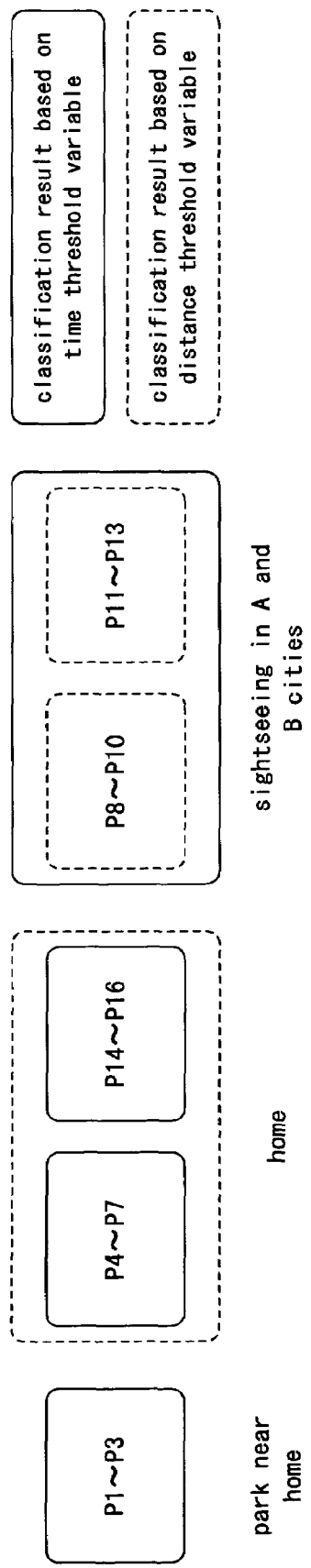
FIG. 20 is an illustration showing a group classification result in the fourth embodiment of the present invention.

As shown in FIG. 20, a hierarchical classification can be performed acquiring event information including two attributes, one of the two attributes relating to a case where the time threshold is variable, and the other of the two attributes relating to a case where the distance threshold is variable.

It is possible to classify the images meet criteria which the user prefers by coding and compiling a program according to the flowchart shown in FIG. 7 (a) and FIG. 19 of the fourth embodiment, and running the program on a computer. Of course, the program may be stored in a recording medium, and the program may be loaded into a computer to be executed thereon.

Fifth Embodiment

Figure 21:
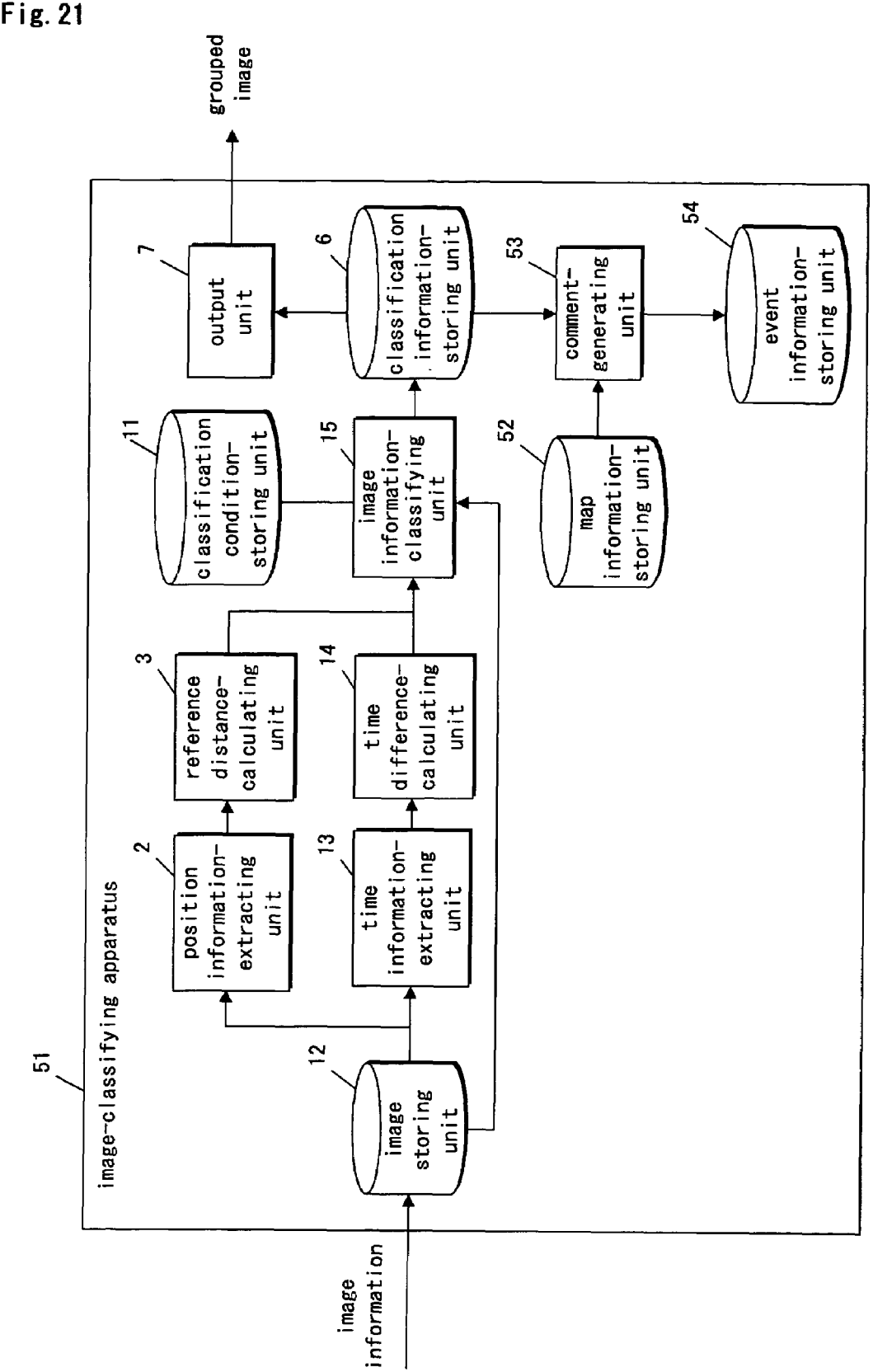
FIG. 21 is a block diagram showing an image-classifying apparatus in a fifth embodiment of the present invention.

An image-classifying apparatus 51 in a fifth embodiment of the present invention is described. FIG. 21 is a block diagram illustrating of an image-classifying apparatus 51 according to the fifth embodiment of the present invention.

As shown in FIG. 21, the image-classifying apparatus 51 in the fifth embodiment of the present invention comprises: the image-classifying apparatus 21 in the second embodiment; and the image-classifying apparatus further comprises the following elements. A map information-storing unit 52 stores map information. A comment-generating unit 53 generates a comment to be provided to a group of image information from the map information that is connected to the classification information-storing unit 6 and stored in the map information-storing unit 52. An event information-storing unit 54 stores the comment generated by the comment-generating unit 53. The map information-storing unit 52 and the comment-generating unit 53 may be directly connected or may be connected via a network.

Map information means information of an address or a building which are stored corresponding to arbitrary position information.

An outline of the operation of the comment-generating unit 53 in the image-classifying apparatus 51 according to the fifth embodiment of the present invention is now described.

Figure 22:
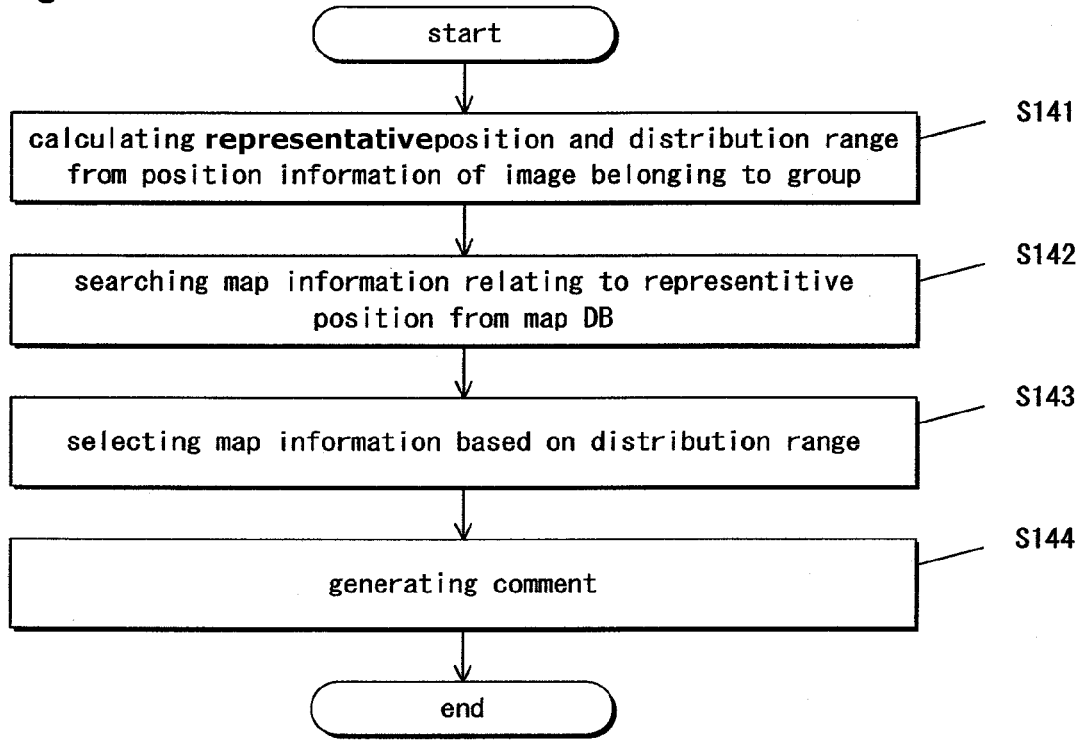
FIG. 22 is a flowchart showing comment generation processes in the fifth embodiment of the present invention.

FIG. 22 is a flowchart indicating processing steps of the comment-generating unit 53 in the image-classifying apparatus 51 according to the fifth embodiment of the present invention.

Figure 23:
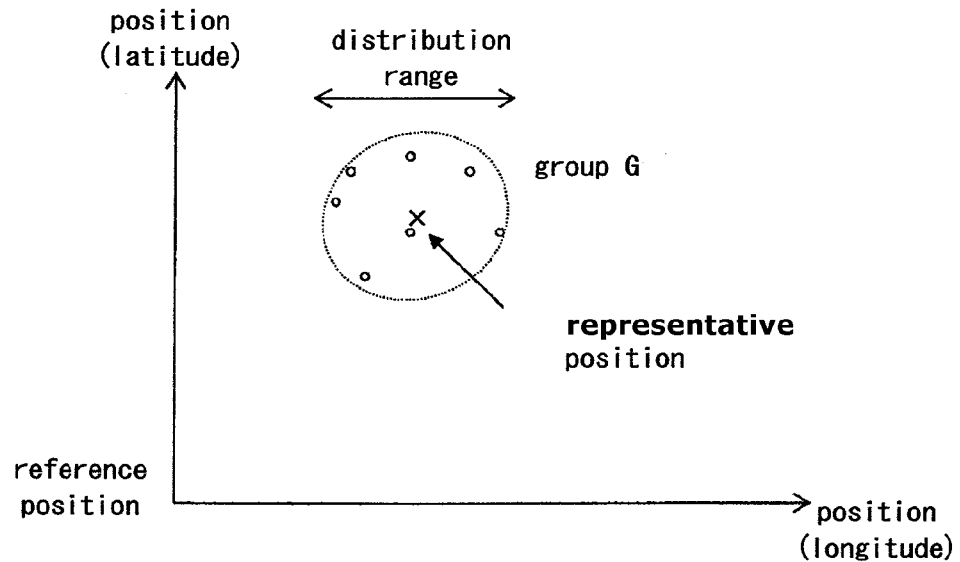
FIG. 23 is a graph showing a relationship between longitude and latitude in the fifth embodiment of the present invention.

As shown in FIG. 22, the comment-generating unit 53 reads the position information of the image information classified into the group whose comment should be generated to store in the classification information-storing unit 6, and calculates a representative position and a distribution range based on a positional distribution thereof. To be more specific, as shown in FIG. 23, the comment-generating unit 53 determines the representative position and the distribution range as follows. Circle symbols are plotted on positions where images belonging to a group were captured on a map. A minimum circle (broken line area) including all of the circle symbols of the group is determined. Then, the comment-generating unit 53 determines a geometric center of the minimum circle as the representative position, and further determines a diameter of the minimum circle as the distribution range (S141).

Next, the comment-generating unit 53 reads map information related with the calculated representative position from the map information-storing unit 52 (S142).

The comment-generating unit 53 selects a portion which should be adopted as a comment according to size of the distribution range calculated at step S141 (S143).

Then, the comment-generating unit 53 stores the comment information selected at step S143 in the event information-storing unit 54, and processes end (S144).

The comment information generated at this time may be also outputted with images belonging to the same group from the output unit 7 to an exterior (e.g. the display apparatus 60). For example, when an image of FIG. 11 is displayed on the display apparatus 60, "OO Park", "home", and "A city" are comment information. When the comment information is outputted with images belonging to the same group, since a user can see the comment information and can directly conceive a corresponding event of the group, burdens for the user can be lessened.

To be more specific, for example, in step S141, assume that a representative position calculated based on position information of image information belonging to a certain group is 139° 44' 55" east, and 35° 39' 19" north and a distribution range thereof is 800 m.

It is further assumed that map information read from the map information-storing unit 52 at step S142 indicates "the Kanto district, Tokyo, the Shiba Park, and the Tokyo Tower."

At step S143, according to the size of the distribution range of the image information, it is determined which item among "Kanto district", "Tokyo", "Shiba Park", and "Tokyo Tower" should be utilized for comment information for the certain group.

The comment-generating unit 53 may include a table that allots the following information for the above-mentioned determination, for example:

when the distribution range of the image information is greater than 0 and less than 100 m, the comment information should indicate "Tokyo Tower (landmark name)";

when the distribution range of the image information is greater 100 m and less than 1 km, the comment information should indicate "Shiba Park (area name)"; when the distribution range of the image information is greater than 1 km and less than 50 km, the comment information should indicate "Tokyo (prefecture name)"; and when the distribution range of the image information is more than 50 km and less than 500 km, the comment information should indicate "Kanto district (region name)".

In the above-mentioned example, since the distribution range of the position information of the image information in the certain group is 800 m, the map information of "Shiba Park" is selected as comment information that should be given to the certain group.

Furthermore, the comment-generating unit 53 may generate the comment information combining time information with the image information. Accordingly, for example, when the image was captured in summer, a comment such as "Shiba Park in summer" can be provided, and when the image was captured on the New Year's Eve through New Year's morning, a comment such as "Shiba Park in New Year's Eve" can be provided.

In addition, the comment-generating unit 53 may also make a full description, referring to calendar information including items of national holidays, the season, almanacs, and so on.

A comment generated by the comment-generating unit 53 can be utilized for a name of a folder, a name of a file, a name of an album, and a description of the album.

It is possible to generate the above-mentioned comments for one or more group, by coding and compiling a program according to the flowchart shown in FIG. 22 of the fifth embodiment, and running the program on a computer. Of course, the program may be stored in a recording medium, and the program may be loaded into a computer to be executed thereon.

According to the fifth embodiment of the present invention, when a representative position of a group is determined, the geometric center position of the circle including all symbols of images is utilized. However, a centroid position of a polygon including all the symbols and/or one or more apexes of the polygon may be also utilized for determining the representative position of the group, and a position that an image was captured at the beginning, in the middle, or at the last in a group may be also a representative position.

When the distribution ranges are utilized, determining the representative position is not limited to utilizing the above-mentioned distribution ranges. For example, the representative position may be determined by utilizing position information of two or more items of image information in a group. The items of image information may include, for example, one or more arbitrary items (e.g. the most distant item from the original point, or the nearest item from the original point) of image information of the group.

In the embodiments of the present invention, an original point is described as being a user's home, but the original point according to the present invention is not limited to the user's home. For example, during the staying-type travel over a long period of time, a hotel at which the user stays may be an original point. Accordingly, images which were captured during travel can be classified as a combination of a plurality of small events.

In the embodiments of the present invention, image information is described as information including an item of a still image, however image information of the present invention is not limited to information including an item of a still image. For example, one or more items of the image information of the present invention may be moving images that were captured with a movie camera. Then, a starting time of shooting the moving images is utilized as an item of time information of the moving images and a starting location of shooting the moving images is utilized as an item of position information of the moving images.

According to the present invention, the image information corresponding to the occurrence which a user recognizes to be a single event can be classified into a group, thereby the group more appropriately corresponds to the user's recognition than the prior art.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An image-classifying apparatus comprising:
   an image information-inputting unit for inputting image information including position information indicating a position where an image was captured;
   a reference distance-calculating unit for calculating, from the position information, a reference distance between a predetermined reference position and the position where the image was captured;
   an image-classifying unit for classifying the image utilizing a classification condition based on the reference distance; and
   a distance difference-calculating unit including a processor, the distance difference-calculating unit for calculating using the processor, from the position information, a distance difference between the position where the image was captured and a position where an image immediately preceding the image was captured,
   wherein said image-classifying unit is further for classifying the image based on the distance difference,
   wherein the classification condition includes at least one distance difference threshold for the distance difference, the at least one distance difference threshold varying with the reference distance, and
   wherein said image-classifying unit is further for classifying the image utilizing the at least one distance difference threshold associated with the reference distance.

2. The image-classifying apparatus as claimed in claim 1, wherein said image-classifying unit is further for classifying the image into one group of a plurality of groups, and
   wherein said image-classifying apparatus further comprises:
   a map information-storing unit for storing a plurality of items of map information;
   a representative position-calculating unit for calculating a representative position based on position information related to at least one image of one group of the plurality of groups;
   a distribution-calculating unit for calculating a distribution of the one group based on position information related to at least one image of the one group; and
   a comment-generating unit for selecting an item of map information from the plurality of items of map information corresponding to the one group into which the image is classified based on the representative position and the position information to generate a comment.

3. The image-classifying apparatus as claimed in claim 2, wherein the map information includes information of an address or a building, and
   wherein said comment-generating unit is further for generating the comment from at least one of the address, the building, and a date.

4. The image-classifying apparatus as claimed in claim 2, wherein the image information includes time information indicating a time when the image was captured, and
   wherein said comment-generating unit is further for generating the comment based on the time information.

5. The image-classifying apparatus as claimed in claim 2, wherein said comment-generating unit generates at least one of a file name and a folder name of the group based on the comment.

6. The image-classifying apparatus as claimed in claim 2, wherein the representative position-calculating unit calculates the representative position based on at least one of a geometric center position, a center-of-mass position, and an apex position generated from the position information related to the at least one image of the one group.

7. The image-classifying apparatus as claimed in claim 1, wherein the image information includes time information indicating a time when the image was captured,
   wherein said image-classifying apparatus further comprises a time difference-calculating unit for calculating, from the time information, a time difference between the time the image was captured and a time an image immediately preceding the image was captured, and
   wherein said image-classifying unit is further for classifying the image based on the reference distance and the time difference.

8. The image-classifying apparatus as claimed in claim 7, wherein the classification condition includes a time difference threshold for the time difference, the time difference threshold varying with the reference distance, and
   wherein said image-classifying unit is further for classifying the image utilizing the time difference threshold associated with the reference distance.

9. The image-classifying apparatus as claimed in claim 7, wherein the image is a moving image, and
   wherein the time information indicates a starting time of shooting the moving image.

10. The image-classifying apparatus as claimed in claim 1, wherein the image information includes time information indicating a time the image was captured, and
    wherein said image-classifying apparatus further comprises:
    a time difference-calculating unit for calculating, from the time information, a time difference between the time the image was captured and a time an image immediately preceding the image was captured; and
    a distance difference-calculating unit for calculating, from the position information, a distance difference between the position where the image was captured and a position where an image immediately preceding the image was captured, and
    wherein said image-classifying unit is further for classifying the image based on the distance difference and the time difference.

11. The image-classifying apparatus as claimed in claim 10, wherein the classification condition includes at least one time difference threshold for the time difference and at least one distance difference threshold for the distance difference, the at least one time difference threshold and the at least one distance difference threshold varying with the reference distance, and
    wherein said image-classifying unit is further for classifying the image utilizing the at least one time difference threshold and the at least one distance difference threshold associated with the reference distance.

12. The image-classifying apparatus as claimed in claim 1, further comprising
    an output unit for outputting the image according to a result of the classification.

13. The image-classifying apparatus as claimed in claim 12, wherein the image information comprises image information for one or more images, and
    wherein said image-classifying unit is further for outputting at least one image of the one or more images within a predetermined range of the reference distance in a manner different from that of images of the one or more images not within the predetermined range of the reference distance.

14. The image-classifying apparatus as claimed in claim 1, further comprising:
- a classification condition-storing unit for storing a plurality of classification conditions,
- wherein said image-classifying unit is further for selecting a classification condition from among the plurality of classification conditions stored in said classification condition-storing unit based on the reference distance, and for classifying the image based on the selected classification condition.

15. The image-classifying apparatus as claimed in claim 1, wherein said image-classifying unit is further for registering an identifier into a list according to the reference distance, the list corresponding to predetermined ranges of the reference distance, and the identifier relating to the image.

16. The image-classifying apparatus as claimed in claim 1, wherein said image-classifying unit is further for saving a data file into one folder of a plurality of folders according to the reference distance, each folder of the plurality of folders corresponding to a predetermined range of the reference distance, and the data file relating to the image.

17. The image-classifying apparatus as claimed in claim 1, wherein the image includes at least one of a still image and a moving image.

18. An image-classifying system comprising:
- an image-shooting apparatus;
- an image-classifying apparatus; and
- a display apparatus,
- wherein said image-shooting apparatus is for capturing an image,
- wherein said image-classifying apparatus comprises:
  - an image information-inputting unit for inputting image information including position information indicating a position where an image was captured;
  - a reference distance-calculating unit for calculating, from the position information, a reference distance between a predetermined reference position and the position where the image was captured;
  - an image-classifying unit for classifying the image utilizing a classification condition based on the reference distance; and
  - an output unit for outputting the image according to a result of the classification;
  - a distance difference-calculating unit including a processor, the distance difference-calculating unit for calculating using the processor, from the position information, a distance difference between the position where the image was captured and a position where an image immediately preceding the image was captured,
- wherein said image-classifying unit is further for classifying the image based on the distance difference,
- wherein the classification condition includes at least one distance difference threshold for the distance difference, the at least one distance difference threshold varying with the reference distance, and
- wherein said image-classifying unit is further for classifying the image utilizing the at least one distance difference threshold associated with the reference distance, and
- wherein said display apparatus is for displaying the image outputted from said image-classifying apparatus.

19. An image-classifying method comprising:
using a processor to perform the following:
- inputting image information including position information indicating a position where an image was captured;
- calculating, from the position information, a reference distance between a predetermined reference position and the position where the image was captured;
- calculating, from the position information, a distance difference between the position where the image was captured and a position where an image immediately preceding the image was captured; and
- classifying, utilizing at least one of the distance difference, a classification condition based on the reference distance, and at least one distance difference threshold for the distance difference, the at least one distance difference threshold varying with the reference distance, the image to generate a classification result.

20. A non-transitory computer-readable recording medium storing an image-classifying program, said program comprising the functions for:
- inputting image information including position information indicating a position where an image was captured;
- calculating, from the position information, a reference distance between a predetermined reference position and the position where the image was captured;
- calculating from the position information, a distance difference between the position where the image was captured and a position where an image immediately preceding the image was captured; and
- classifying, utilizing at least one of the distance difference, a classification condition based on the reference distance, and at least one distance difference threshold for the distance difference, the at least one distance difference threshold varying with the reference distance, the image to generate a classification result.

* * * * *